(12) United States Patent
Morozumi et al.

(10) Patent No.: US 12,214,651 B2
(45) Date of Patent: Feb. 4, 2025

(54) BATTERY DEVICE AND ELECTRIC BICYCLE

(71) Applicant: YAMAHA HATSUDOKI KABUSHIKI KAISHA, Iwata (JP)

(72) Inventors: Norihiro Morozumi, Shizuoka (JP); Noriyasu Ishikawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 243 days.

(21) Appl. No.: 17/873,233

(22) Filed: Jul. 26, 2022

(65) Prior Publication Data
US 2023/0030226 A1     Feb. 2, 2023

(30) Foreign Application Priority Data

Jul. 30, 2021    (JP) ................................. 2021-126242

(51) Int. Cl.
| | |
|---|---|
| *B60K 1/04* | (2019.01) |
| *B60L 50/64* | (2019.01) |
| *H01M 50/249* | (2021.01) |
| *H01M 50/264* | (2021.01) |
| *B60L 53/80* | (2019.01) |

(52) U.S. Cl.
CPC ................ *B60K 1/04* (2013.01); *B60L 50/64* (2019.02); *H01M 50/249* (2021.01); *H01M 50/264* (2021.01); *B60L 53/80* (2019.02); *H01M 2220/20* (2013.01)

(58) Field of Classification Search
CPC .............. B60K 1/04; B60K 2001/0455; B60K 2001/0472; B60L 50/64; B60L 53/80; B60L 50/20; B60L 2200/12; H01M 50/249; H01M 50/264; H01M 2220/20; H01M 50/244; H01M 50/262; B62J 43/28;
(Continued)

(56) References Cited

U.S. PATENT DOCUMENTS

| | | | |
|---|---|---|---|
| 9,914,501 B2 * | 3/2018 | Marioni | ................... B60L 50/20 |
| 11,052,968 B2 * | 7/2021 | Slaoui | .................... B62K 19/30 |

(Continued)

FOREIGN PATENT DOCUMENTS

| | | | |
|---|---|---|---|
| CN | 211766033 U | * | 10/2020 |
| CN | 112550548 A | | 3/2021 |

(Continued)

*Primary Examiner* — James A Shriver, II
*Assistant Examiner* — Michael T. Walsh
(74) *Attorney, Agent, or Firm* — Keating & Bennett, LLP

(57) ABSTRACT

A battery device of an electric bicycle includes a battery, a battery mount which allows attachment/detachment of the battery, a stepped portion, and a restriction release in a first end of the battery, and an engaging portion and a second movement restrictor in a first support of the battery mount. The engaging portion is restricted in its movement, by the second movement restrictor, from an engaged position where it is engaged by the stepped portion to a disengaged position where it is not engaged by the stepped portion. When the battery is to be removed, from the battery mount, the restriction by the second movement restrictor is removed, the restriction release is used to move the engaging portion from the engaged position to the disengaged position, and then the battery is pulled in a removal direction, to remove the battery from the battery mount.

20 Claims, 22 Drawing Sheets

(58) Field of Classification Search
CPC ........... B62J 43/13; B62K 19/40; B62M 6/90;
B60Y 2200/13; Y02E 60/10
See application file for complete search history.

(56) References Cited

U.S. PATENT DOCUMENTS

| | | | |
|---|---|---|---|
| 11,211,661 B2 * | 12/2021 | Durkee | ............... H01M 50/202 |
| 12,043,343 B2 * | 7/2024 | Bock | ........................ B60K 1/04 |
| 2019/0337587 A1 | 11/2019 | Den Hertog | |
| 2021/0126230 A1 * | 4/2021 | Liu | ......................... B62M 6/90 |

FOREIGN PATENT DOCUMENTS

| | | | | |
|---|---|---|---|---|
| DE | 102019133251 A1 * | 3/2021 | ............. | B62H 5/001 |
| DE | 202021100619 U1 * | 4/2021 | | |
| JP | 2019-153472 A | 9/2019 | | |
| TW | M525556 U * | 7/2016 | | |
| TW | 202207513 A * | 2/2022 | .......... | H01M 50/244 |

\* cited by examiner

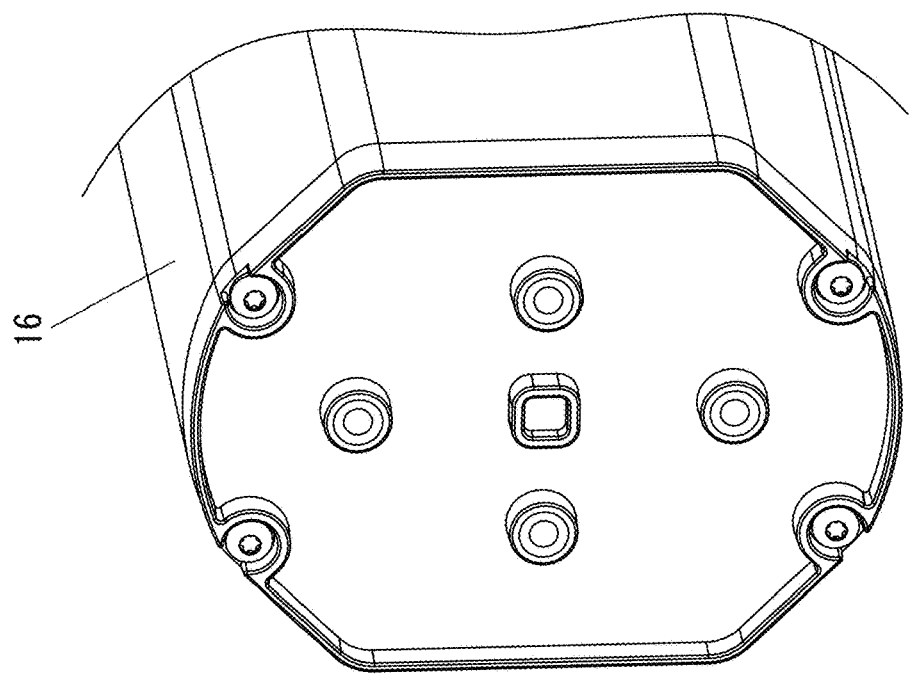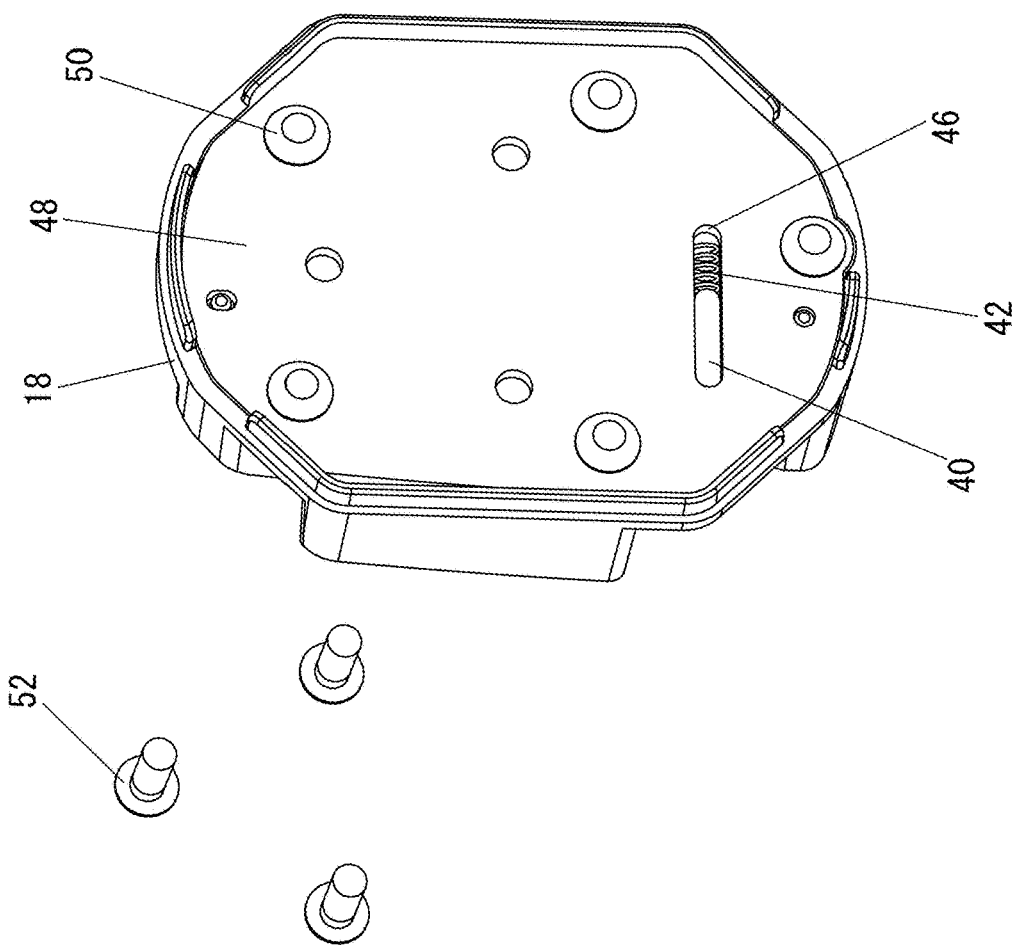
F I G. 4

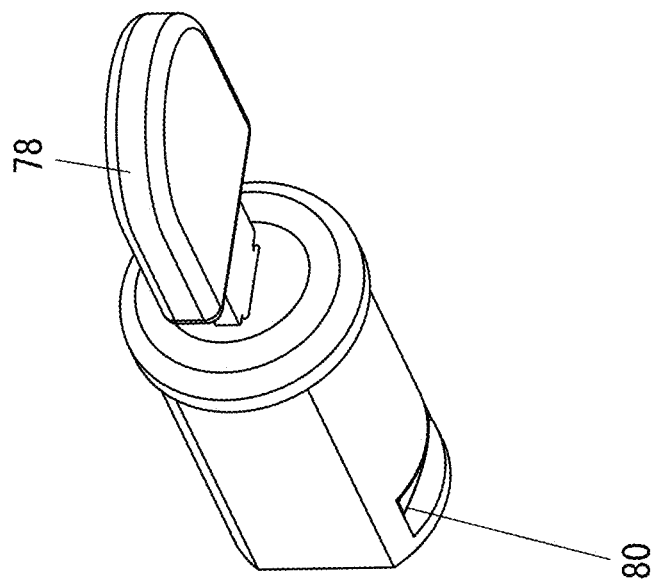
F I G. 7A
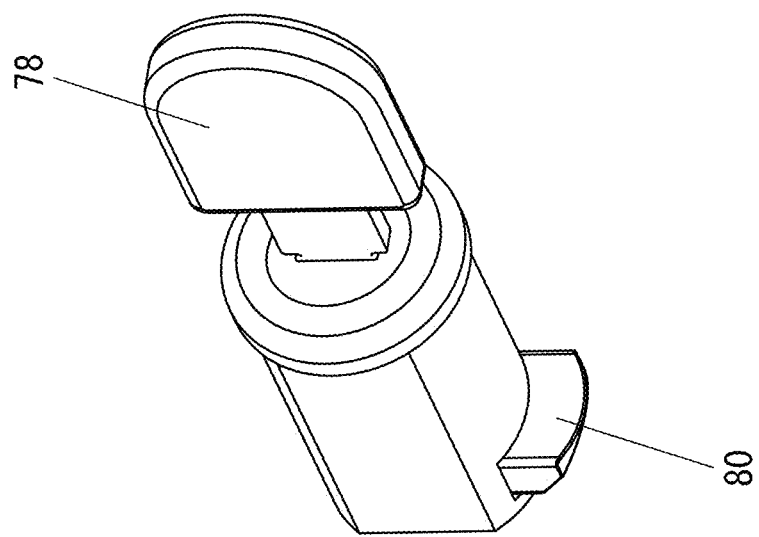
F I G. 7B

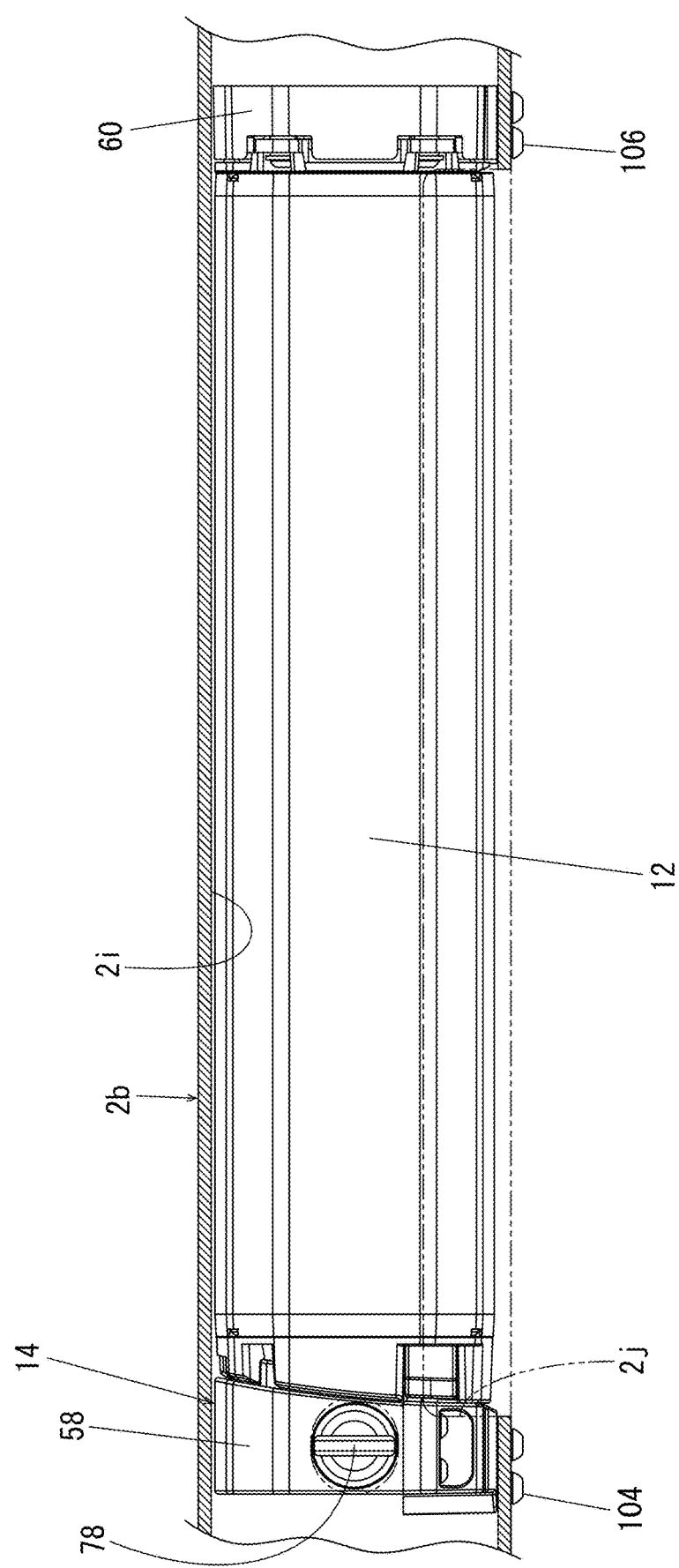

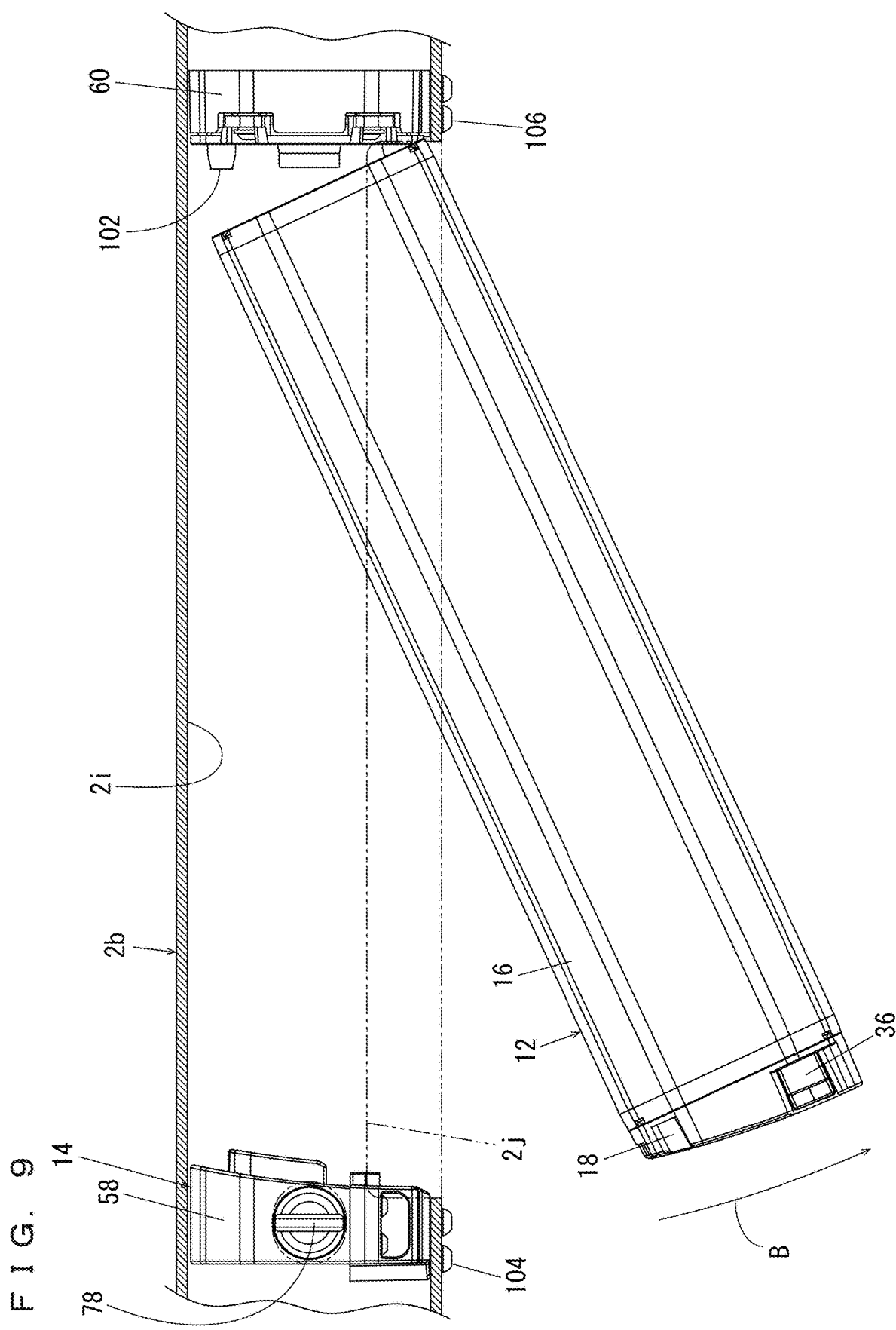

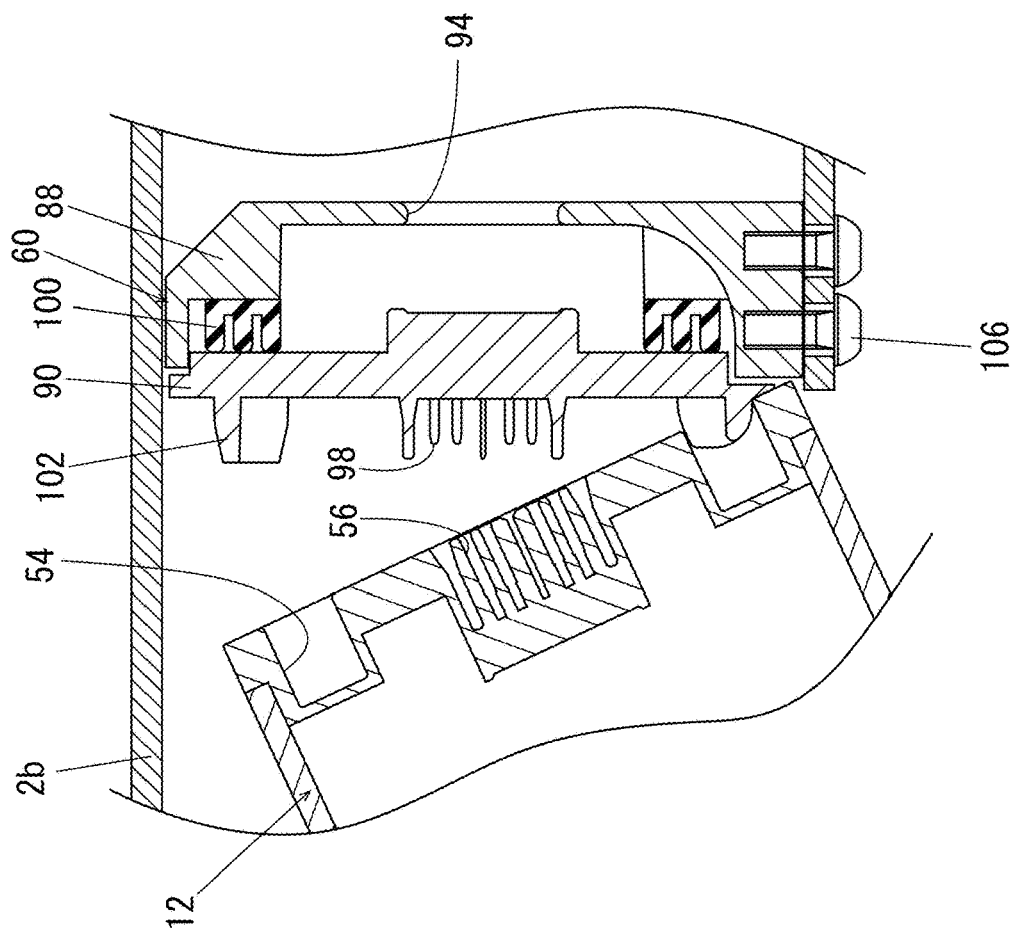
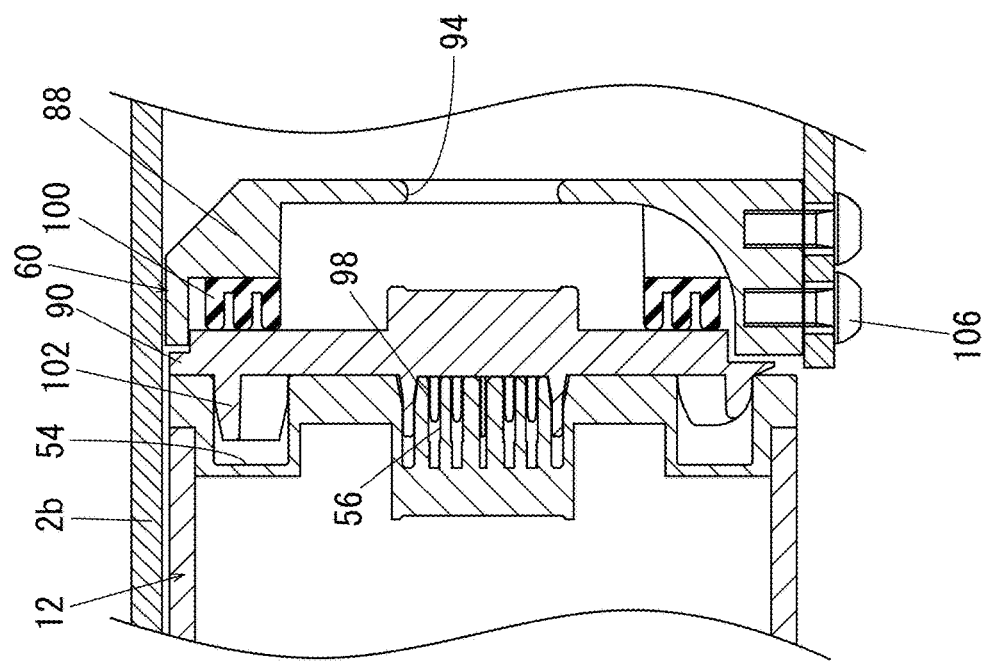

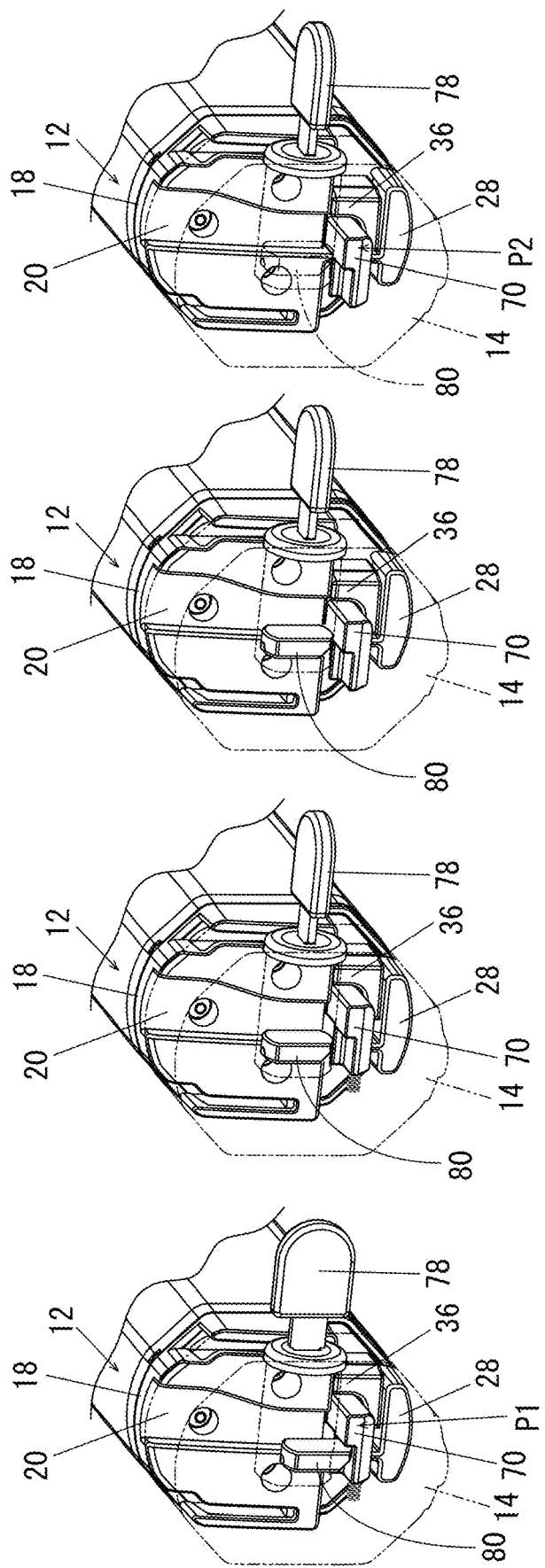

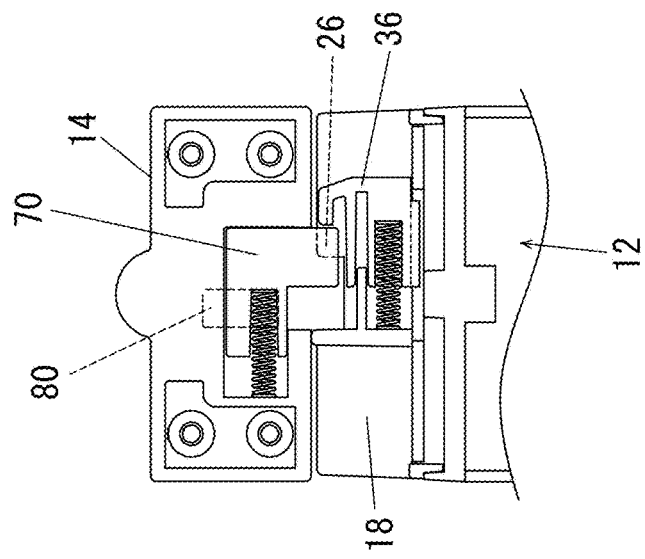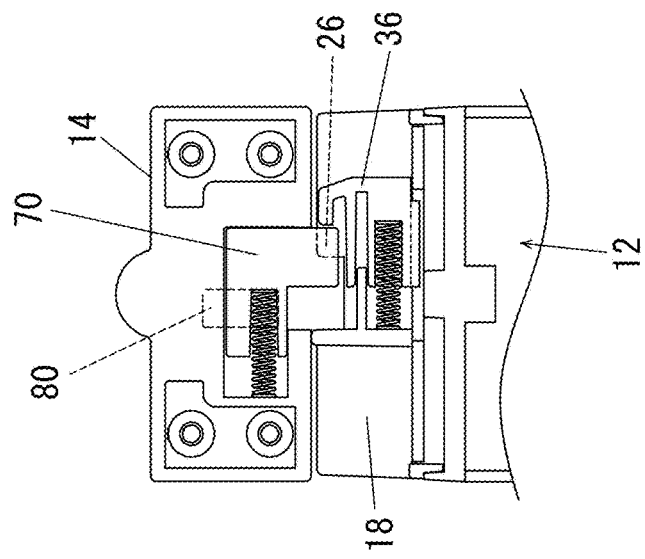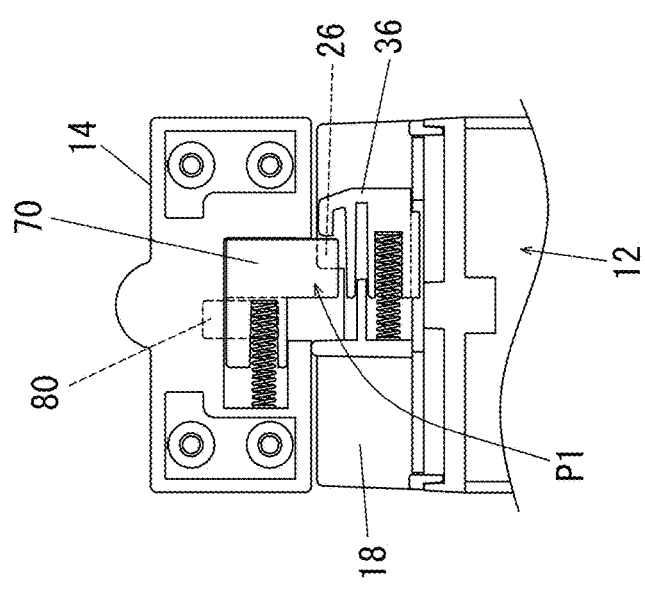

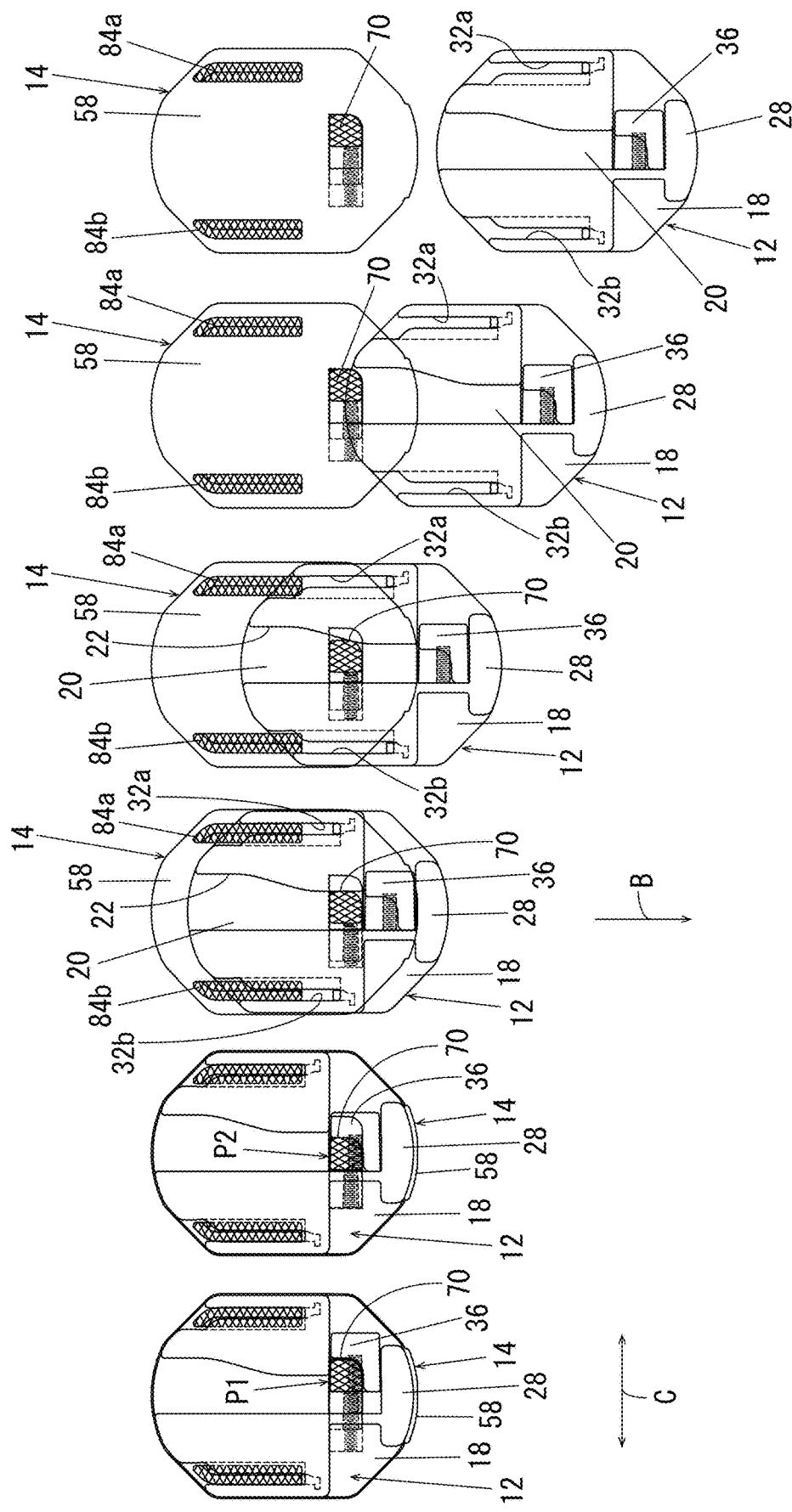

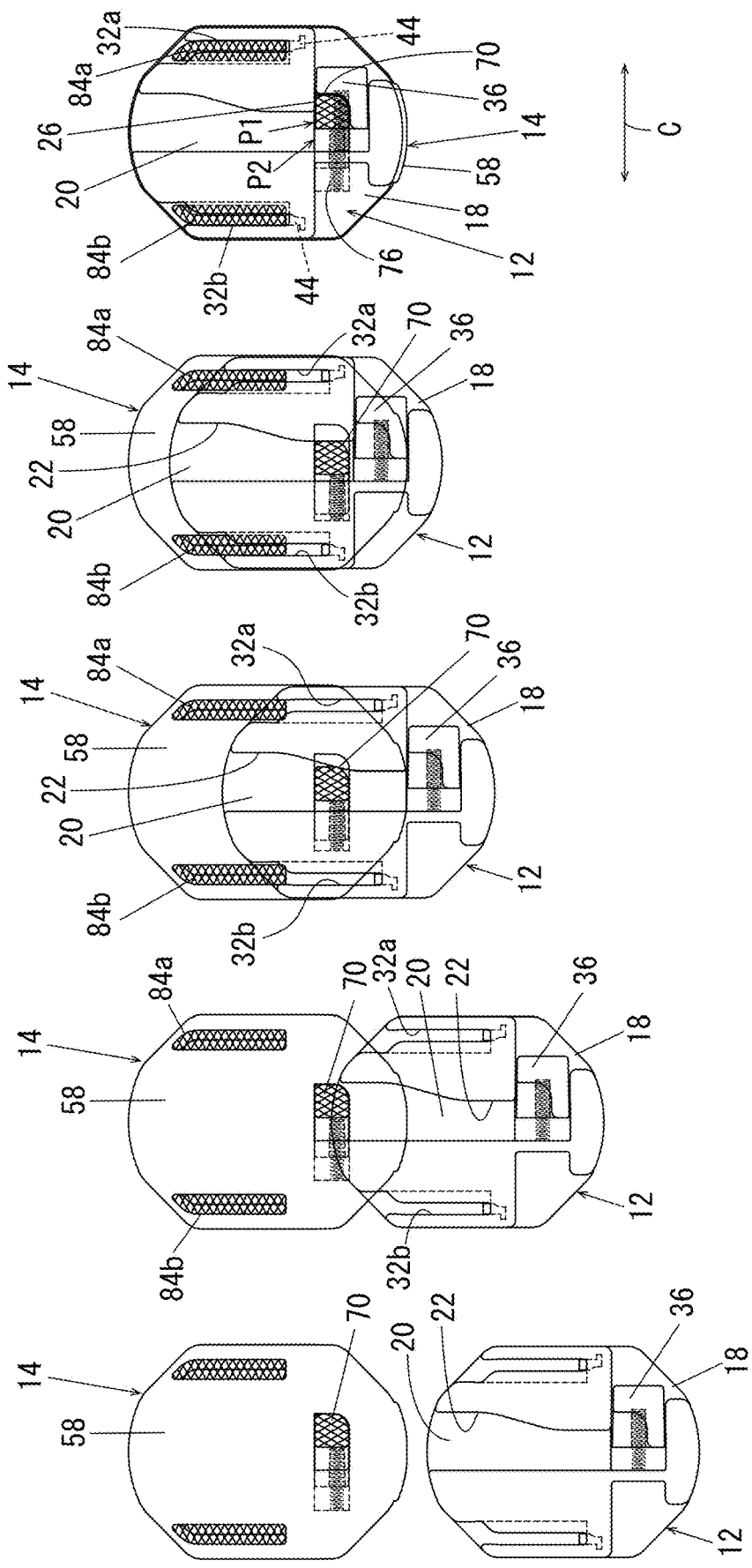

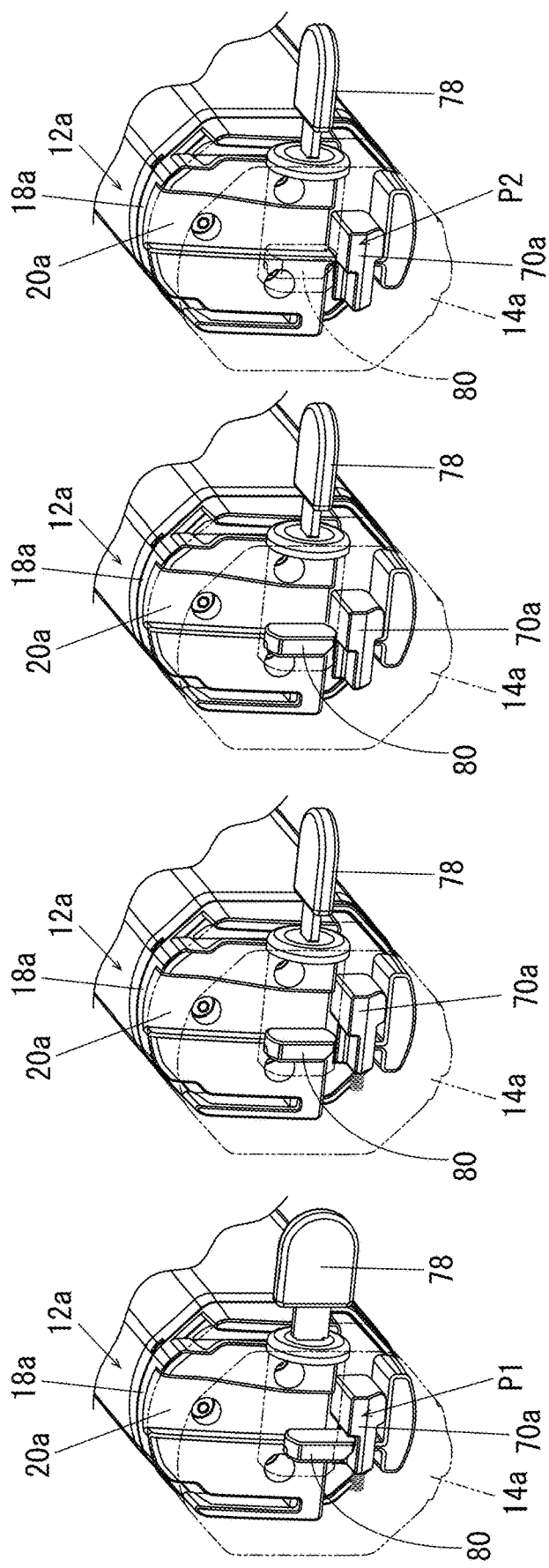

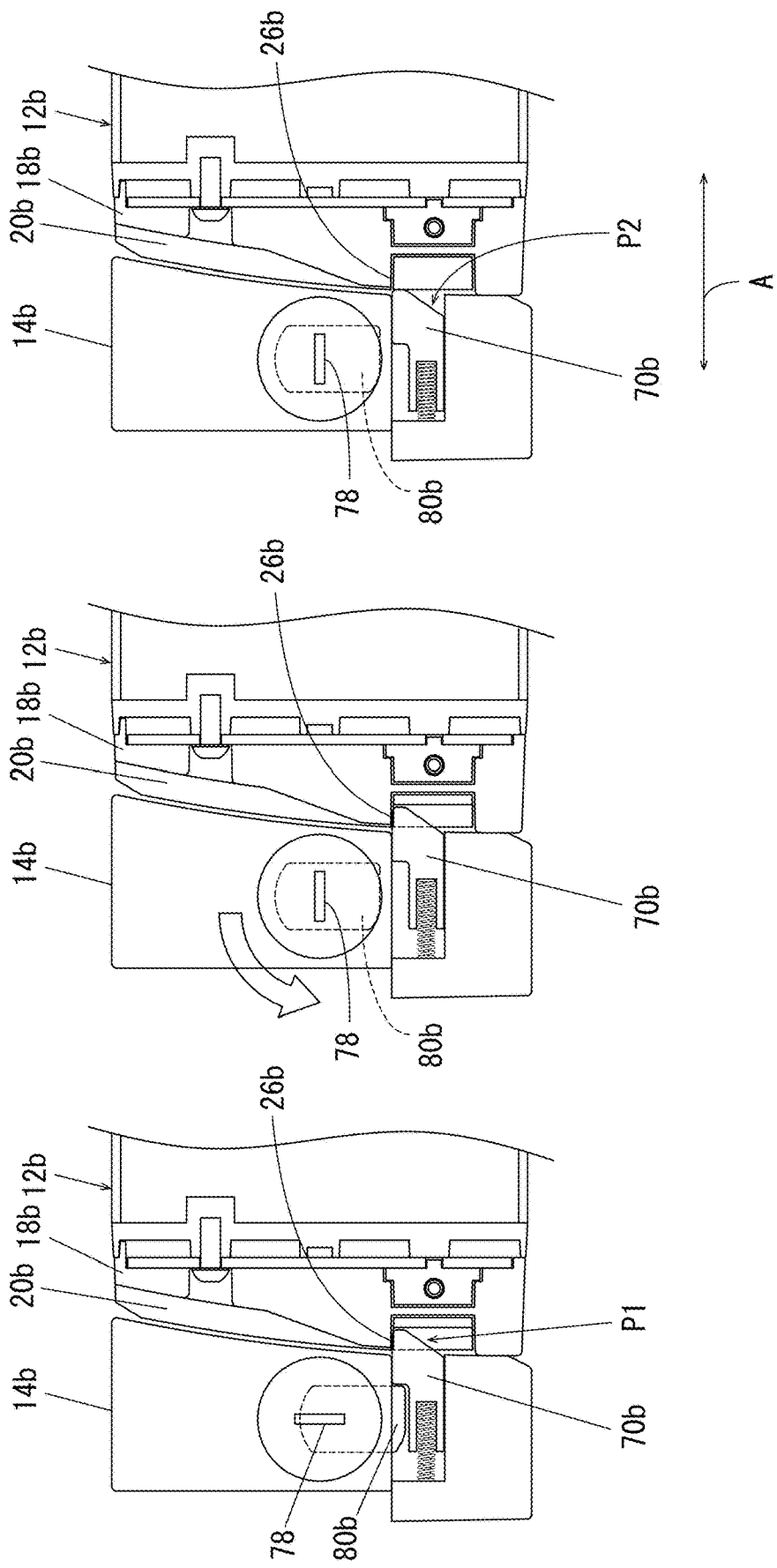

BATTERY DEVICE AND ELECTRIC BICYCLE

CROSS REFERENCE TO RELATED APPLICATIONS

This application claims the benefit of priority to Japanese Patent Application No. 2021-126242 filed on Jul. 30, 2021. The entire contents of this application are hereby incorporated herein by reference.

BACKGROUND OF THE INVENTION

1. Field of the Invention

The present invention relates to battery devices and electric bicycles, and more specifically to a battery device and an electric bicycle in which a battery is attachable/detachable.

2. Description of the Related Art

JP-A 2019-153472 discloses an electric bicycle as an example which is pertinent to conventional techniques of this kind. The electric bicycle has a motor unit which includes a battery device and a drive unit; and a frame to which the battery device and the drive unit are attached. The battery device has a battery and a battery mounting portion. The battery mounting portion is a portion to which the battery is attachable, and it is possible to detach the battery from a mounting position where the battery is attached along an unmounting direction toward an unmounting position where the battery is removed. Further, the battery device has a positioning portion, a release operation portion, a movement restriction portion, and a derestriction portion. The positioning portion positions the battery at the mounting position. The release operation portion releases the positioning made by the positioning portion. Also, the movement restriction portion restricts the battery's movement along the unmounting direction between the mounting position and the unmounting position. The derestriction portion releases the restriction by the movement restriction portion.

According to the electric bicycle as disclosed in JP-A 2019-153472, removing the battery requires a maximum of four steps (releasing the battery from positioning, pulling the battery, releasing the battery from the movement-restricted state, and the second pulling of the battery), in other words, it requires a time-consuming process.

SUMMARY OF THE INVENTION

Preferred embodiments of the present invention provide battery devices and electric bicycles each which allow battery removal at a higher level of operability.

According to a preferred embodiment of the present invention, a battery device includes a battery, a battery mount including a first support and a second support respectively supporting a first end and a second end of the battery to allow attachment/detachment of the battery, a first movement restrictor provided at the first end of the battery, an engaging portion provided in the first support movable between an engaged position to engage with the first movement restrictor and a disengaged position in which the engaging portion is not engaged with the first movement restrictor, and a second movement restrictor provided in the first support to position the engaging portion at the engaged position to restrict the engaging portion from moving toward the disengaged position. In the battery device, the battery is removed from the battery mount in a removal direction that is either a direction in which the battery is pivoted around the second end of the battery or a direction that is perpendicular or substantially perpendicular to a longitudinal direction of the battery. The engaged position and the disengaged position of the engaging portion are provided along a widthwise direction or the longitudinal direction of the battery, and the engaged position is a position where the engaging portion is in engagement with the first movement restrictor to make the battery non-removable from the battery mount, whereas the disengaged position is a position where the engaging portion is not in engagement with the first movement restrictor to make the battery removable from the battery mount.

In a preferred embodiment of the present invention, in a state where the battery is attached to the battery mount, the second movement restrictor provided in the first support acts on the engaging portion such that the engaging portion provided in the first support is in the engaged position where the engaging portion is restricted from moving to the disengaged position. Since the engaging portion, which is in the engaged position, is engaged by the first movement restrictor provided at the first end of the battery, it is now impossible to remove the battery from the battery mount, i.e., the mounting of the battery onto the battery mount is now locked. When the battery is to be removed from the state of mounting, the engaging portion is moved from the engaged position to the disengaged position by removing or overriding the restriction posed by the second movement restrictor such that the engagement between the engaging portion and the first movement restrictor is disengaged, and thereafter, the battery is pulled in the removal direction, to remove from the battery from the battery mount. As described above, with a simple action of moving the engaging portion from the engaged position to the disengaged position and then pulling out the battery, it is possible to remove the battery from the battery mount in a simple manner.

Preferably, the first movement restrictor includes a stepped portion provided in the first end of the battery. In this case, by making the engaging portion engage with the stepped portion it becomes possible to easily prohibit the movement of the engaging portion in the detaching direction.

Further preferably, the second movement restrictor includes a first biaser to bias the engaging portion from the disengaged position toward the engaged position. In this case, by biasing the engaging portion from the disengaged position toward the engaged position with the first biaser it becomes possible to easily position the engaging portion at the engaged position.

Further, preferably, the second movement restrictor includes a stopper and an operator to advance/retract the stopper to/from a position where the stopper is engaged by the engaging portion. In this case, by making the stopper move with the operation of the operator, it becomes possible to easily move the stopper into and out of the position where it is engaged with the engaging portion. Therefore, it is possible by operating the operator to position the engaging portion at the engaged position and easily restrict the engaging portion from moving to the disengaged position.

Preferably, the battery device further includes a restriction release provided in the first end of the battery to move the engaging portion from the engaged position to the disengaged position. In this case, it becomes possible with the restriction release to easily move the engaging portion from the engaged position to the disengaged position. In particular, since it is possible to move the engaging portion indirectly, the arrangement offers an advantage in cases where it is not possible to operate the engaging portion directly.

Further preferably, the restriction release is movable in a widthwise direction of the battery. If the restriction release were to be moved in the longitudinal direction of the battery, the user could only move his/her fingers in one direction, i.e., he/she cannot pinch the restriction release with two fingers. However, by making the restriction release movable in the widthwise direction of the battery, it becomes possible to pinch the restriction release with the user's fingers, which makes it even easier to remove the battery.

Further, preferably, the battery device further includes a restriction release provided in the first end of the battery to move the engaging portion from the engaged position to the disengaged position, and the restriction release is on a more downstream side than an operator of the second movement restrictor in the removal direction. In this case, it is possible to support the battery by one hand and to operate the restriction release at the same time, i.e., there is no need to use the other hand to support the battery, and the arrangement makes it easy to remove the battery. This arrangement is especially effective when the battery is removed downward from the battery mount.

Preferably, the battery device further includes a second biaser to bias the restriction release from the disengaged position toward the engaged position. In this case, it becomes possible to make the restriction release not overlap the first movement restrictor, and to secure a space for the engaging portion to move within. As a result, when mounting the battery, the engaging portion does not hit the restriction release in the middle of the process when the engaging portion moves from the disengaged position to the engaged position. This arrangement makes it possible for the engaging portion to move smoothly. Also, it is possible to provide the restriction release at a location where it is easily operated. Further, when the battery is removed and carried by itself, the restriction release is biased in one direction making it possible to reduce uncomfortable rattling noises.

Further preferably, the battery device further includes a guide provided in the first end of the battery and extending at least in the removal direction as viewed from the longitudinal direction of the battery, to guide the engaging portion. In this case, it is possible to remove the battery smoothly from the battery mount by the guide guiding the engaging portion.

Further, preferably, the battery device further includes a groove including the guide and provided in the first end of the battery and extending at least in the removal direction as viewed from the longitudinal direction of the battery to allow the engaging portion to pass therethrough. In this case, by letting the engaging portion slide inside the groove, it becomes possible to remove the battery reliably from the battery mount.

Preferably, the groove is wider on its upstream side than its downstream side in the removal direction. In this case, it becomes easier to insert the engaging portion into the groove, which makes possible to mount the battery on the battery mount easily.

Further preferably, the battery device further includes a guide tab provided in one of the battery and the battery mount, and a guide groove provided in the other of the battery and the battery mount to receive the guide tab therein. In this case, the guide groove is fitted with the guide tabs such that it becomes possible to restrict the battery from tilting or rotating with respect to the battery mount.

Further, preferably, the guide tab is provided in the first support and extends along the removal direction as viewed from the longitudinal direction of the battery, and the guide groove is provided in the first end of the battery and extends along the removal direction as viewed from the longitudinal direction of the battery. In this case, the guide groove and the guide are provided at the first end of the battery while the guide tab and the engaging portion are provided at the first support. Therefore, the user is able to only focus his/her attention onto the first end side of the battery. This makes it possible to mount the battery easily onto the battery mount.

Preferably, the guide tab is provided on a more upstream side than the engaging portion in the removal direction. In this case, it is possible to move the guide tab by fitting it into the guide groove after moving the engaging portion along the guide. Therefore, it is possible to smoothly mount the battery onto the battery mount.

Further preferably, the guide tab includes a first engagement portion, and the guide groove includes a second engagement portion which is engageable with the first engagement portion. In this case, the first engagement portion of the guide tab engages with the second engagement portion of the guide groove. This helps discourage theft of the battery.

Further, preferably, the engaging portion and the first movement restrictor have an engagement margin greater than a clearance between the first engagement portion and the second engagement portion when the battery is mounted on the battery mount and the engaging portion is in the engaged position. In this case, the engaging portion is engaged by the first movement restrictor even in a situation where the first engagement portion is engaged with the second engagement portion. Therefore, it is possible, regardless of whether or not the first engagement portion and the second engagement portion are engaged with each other, to bring the engaging portion at the engaged position into engagement with the first movement restrictor, i.e., it is possible to prevent a situation that the engagement between the engaging portion and the first movement restrictor is lost unwillingly.

Preferably, the battery device further includes a damper provided in the guide groove. In this case, when the battery is mounted onto the battery mount, it is possible with the damper to keep the engaging portion and the first movement restrictor pressed together, making possible to reduce rattling of the battery in the detaching direction.

Further preferably, the battery device further includes a T-shaped or substantially T-shaped receiver provided in the first end of the battery. In this case, since the receiver has a shape substantially the same as the shape of the letter T, it becomes easy to hook the user's fingers and to pull the battery from the mounting position. This arrangement is effective especially when the battery is attached/detached from above.

The battery device according to preferred embodiments of the present invention is suitably applied to an electric bicycle.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a perspective view which shows the mounting portion, a first end portion of a battery main body, and so on.

FIGS. 7A and 7B are illustrative drawings which show positional relationships between a stopper and an operation portion during an operation, in which FIG. 7A shows a state where the stopper is lifted and FIG. 7B shows a state where the stopper is lowered.

FIG. 8 is an illustrative drawing which shows a state where the battery is attached to the battery mounting portion.

FIG. 9 is an illustrative drawing which shows a state where the battery is being detached from the battery mounting portion.

FIGS. 10A and 10B are sectional views which show positional relationships between the second end portion of the battery and the second support portion when the battery is attached to/detached from the battery mounting portion, in which FIG. 10A shows a state as attached, and FIG. 10B shows a state when attaching/detaching.

FIGS. 11A and 11B are illustrative drawings which show relationships between clearances from the first engagement portion to the second engagement portion, and an engagement margin of an engaging portion and a stepped portion, in which FIG. 11A shows a normal state, and FIG. 11B shows an engaged state.

FIGS. 12A to 12D are perspective views which show movement of the stopper and the engaging portion when an operation portion and a restriction release are operated.

FIGS. 14A to 14C are illustrative bottom views which show movement of the stopper and the engaging portion when the operation portion and the restriction release are operated.

FIGS. 15A to 15F are illustrative drawings which show changes in positional relationships between the mounting portion of the battery and the first support portion of the battery mounting portion when the battery is being detached.

FIGS. 16A to 16E are illustrative drawings which show changes in positional relationships between the mounting portion of the battery and the first support portion of the battery mounting portion when the battery is being attached.

FIGS. 17A to 17D are perspective views which show, in a preferred embodiment of the present invention using an engaging portion that also works as a restriction release, movement of a stopper and the engaging portion when an operation portion and the engaging portion are operated.

FIGS. 20A to 20C are illustrative side views which show, in a preferred embodiment of the present invention where an engaging portion moves in a longitudinal direction of the battery, movement of a stopper and the engaging portion when an operation portion and a restriction release are operated.

DETAILED DESCRIPTION OF THE PREFERRED EMBODIMENTS

Hereinafter, preferred embodiments of the present invention will be described with reference to the drawings.

Figure 1:
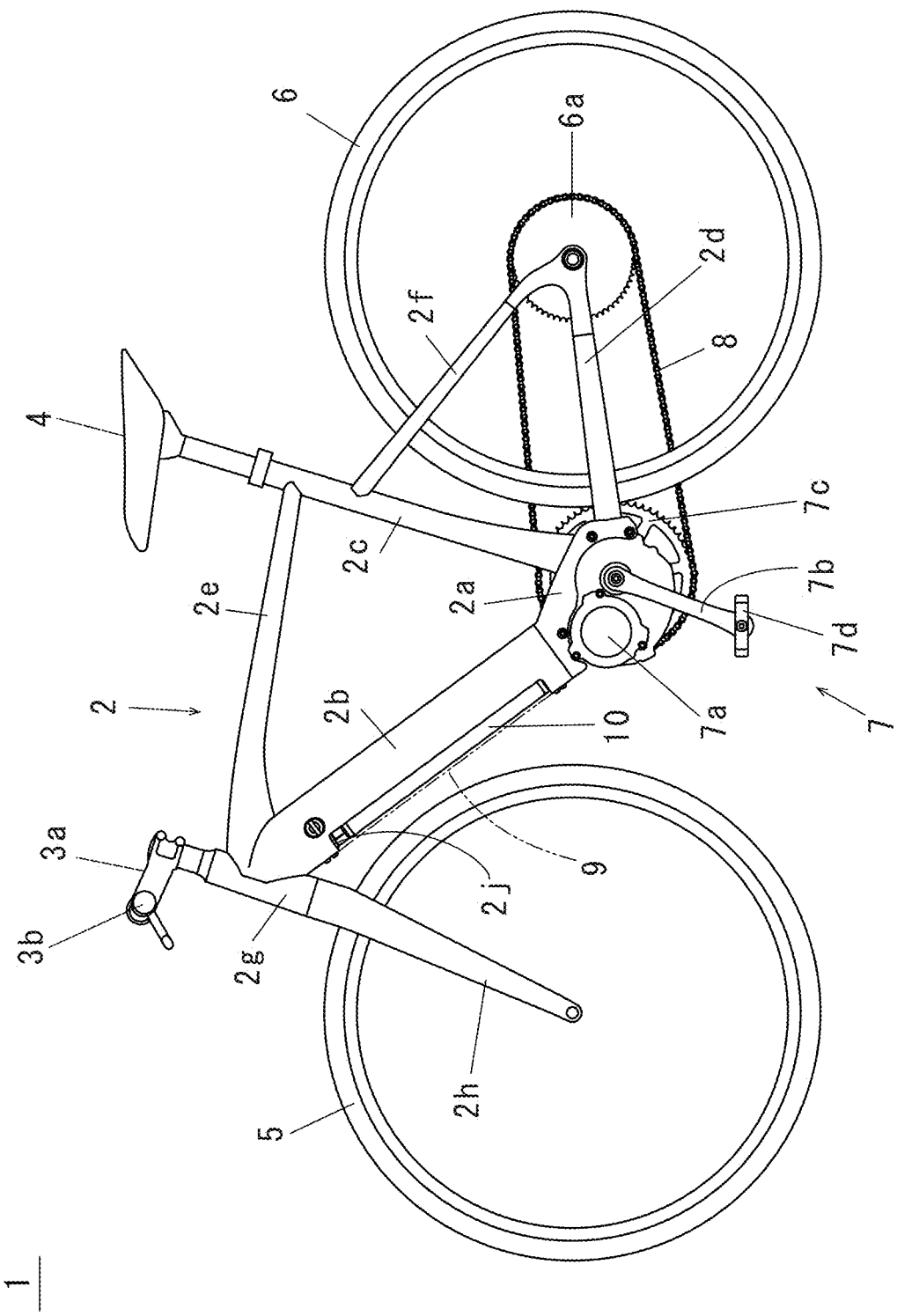
FIG. 1 is a side view which shows an electric bicycle according to a preferred embodiment of the present invention.

Referring to FIG. 1, an electric bicycle 1 according to a preferred embodiment the present invention is an electrically assisted bicycle in which the tread force by the user is assisted by a motor 7a (which will be described below).

The electric bicycle 1 includes a frame 2. The frame 2 includes a bottom bracket 2a, a down tube 2b, a seat tube 2c, a pair of chain stays 2d, a top tube 2e, a pair of seat stays 2f, a head tube 2g, and a front fork 2h.

The bottom bracket 2a is connected with a lower end portion of the down tube 2b, a lower end portion of the seat tube 2c, and front end portions of the pair of chain stays 2d. In other words, the down tube 2b extends diagonally ahead from the bottom bracket 2a, the seat tube 2c extends upward but slightly titled rearward from the bottom bracket 2a, and the pair of chain stays 2d extend rearward from the bottom bracket 2a. The top tube 2e connects an upper end portion of the down tube 2b with a portion near an upper end portion of the seat tube 2c. The pair of seat stays 2f connect an upper portion of the seat tube 2c with rear end portions of the pair of chain stays 2d. The head tube 2g is connected with a front end portion of the top tube 2e and an upper end portion of the down tube 2b. The front fork 2h is inserted rotatably into the head tube 2g, and is slightly tilted rearward.

A handle stem 3a is attached to an upper end portion of the front fork 2h. The handle stem 3a supports a handle 3b. The seat tube 2c supports a saddle 4. Lower end portions of the front fork 2h rotatably support a front wheel 5. Rear end portions of the pair of chain stays 2d rotatably support a rear wheel 6. A drive unit 7 is attached to the bottom bracket 2a. The drive unit 7 includes the motor 7a, a crank 7b, a drive sprocket 7c, and a pair of pedals 7d. The crank 7b is rotatably supported by the bottom bracket 2a. The drive sprocket 7c is attached to an intermediate portion in a width direction of the crank 7b and moves with the crank 7b. The pair of pedals 7d are attached to respective end portions of the crank 7b. The rear wheel 6 includes a rear sprocket 6a. The drive sprocket 7c and the rear sprocket 6a are connected with each other via a chain 8. The down tube 2b includes a hollow portion 2i, and an opening 2j on its bottom side (see FIG. 8 and FIG. 9). The opening 2j of the down tube 2b is provided with an openable/closable cover 9. The down tube 2b is provided with a battery device 10.

In the electric bicycle 1 as described above, upon input of a tread force from the pedals 7d, the drive unit 7 generates a drive assisting output by the motor 7a in accordance with the tread force to assist with the tread force. The drive sprocket 7*c* rotates as the crank 7*b* rotates, and also receives the output from the motor 7*a*. In other words, the drive unit 7 transmits the tread force from the pedals 7*d* and the crank 7*b* and the output from the motor 7*a* to the drive sprocket 7*c*. The power transmitted to the drive sprocket 7*c* is transmitted to the rear wheel 6 via the chain 8.

Next, description will be made of the battery device 10.

Figure 2:
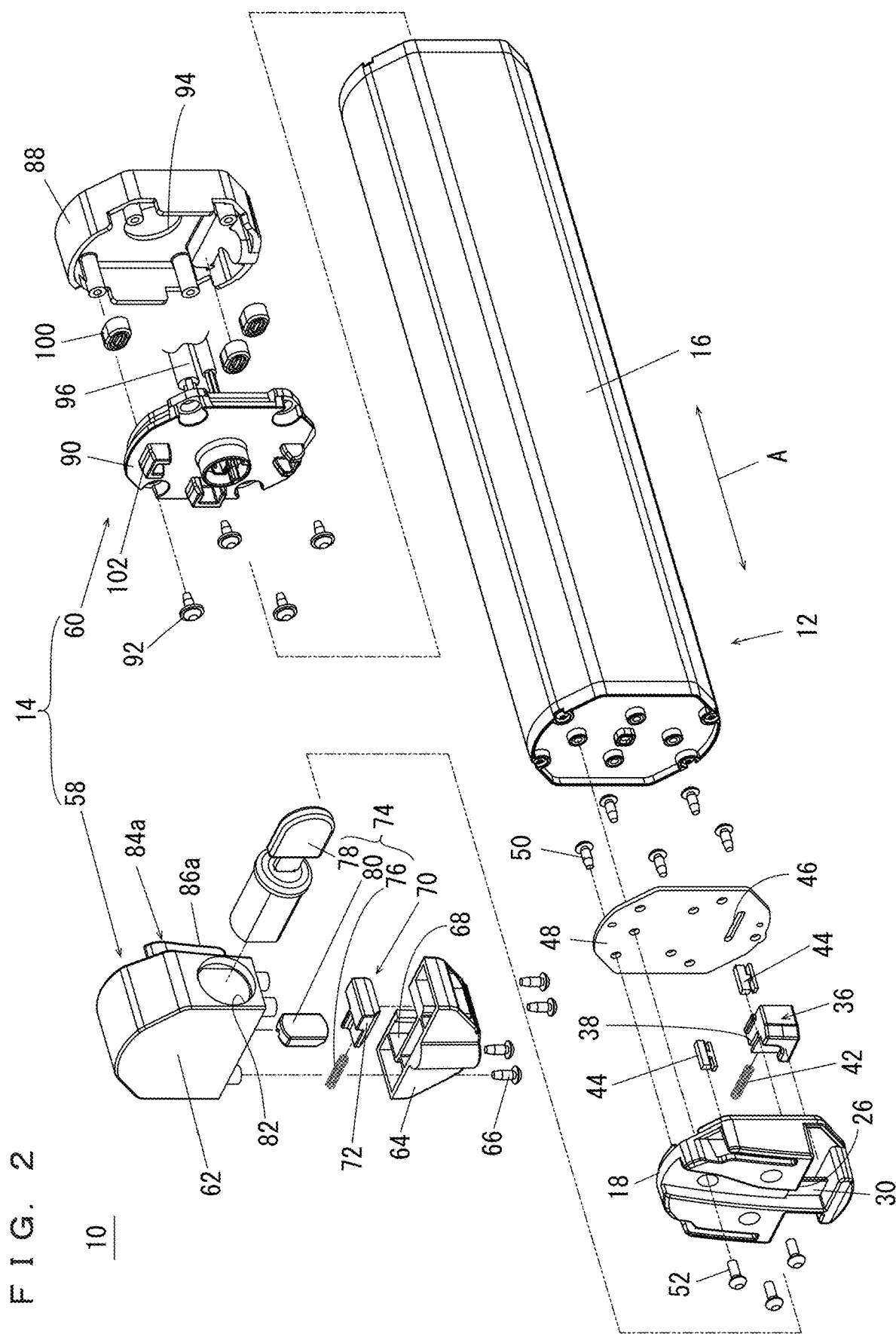
FIG. 2 is an exploded perspective view which shows a battery device according to a preferred embodiment of the present invention.

Referring to FIG. 2, the battery device 10 includes a battery 12 and a battery mounting portion 14.

The battery 12 includes a battery main body 16 and a mounting portion 18 provided at a first end portion of the battery main body 16.

Figure 3:
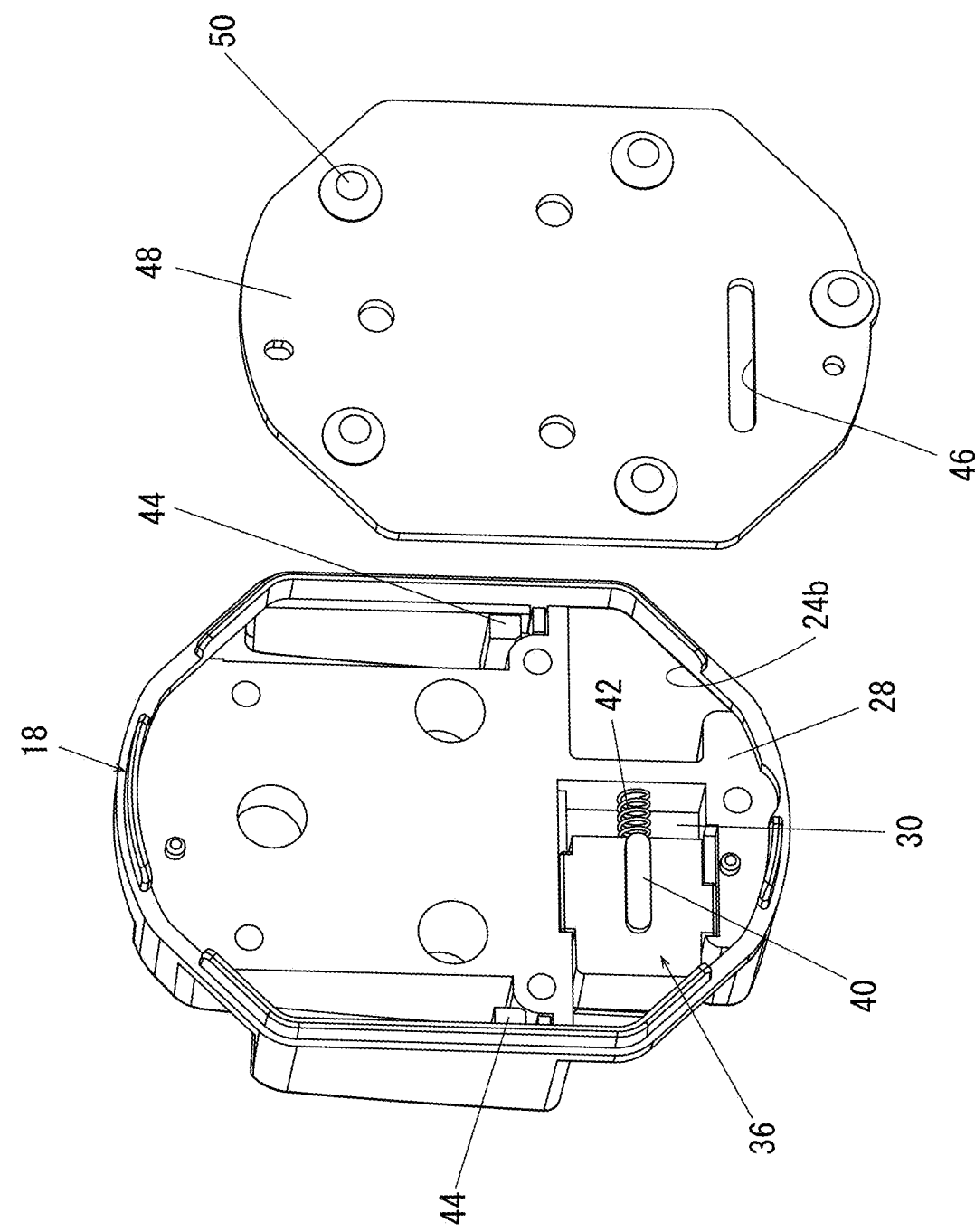
FIG. 3 is an exploded perspective view which shows a mounting portion, a back lid, and so on of a battery.
Figure 5:
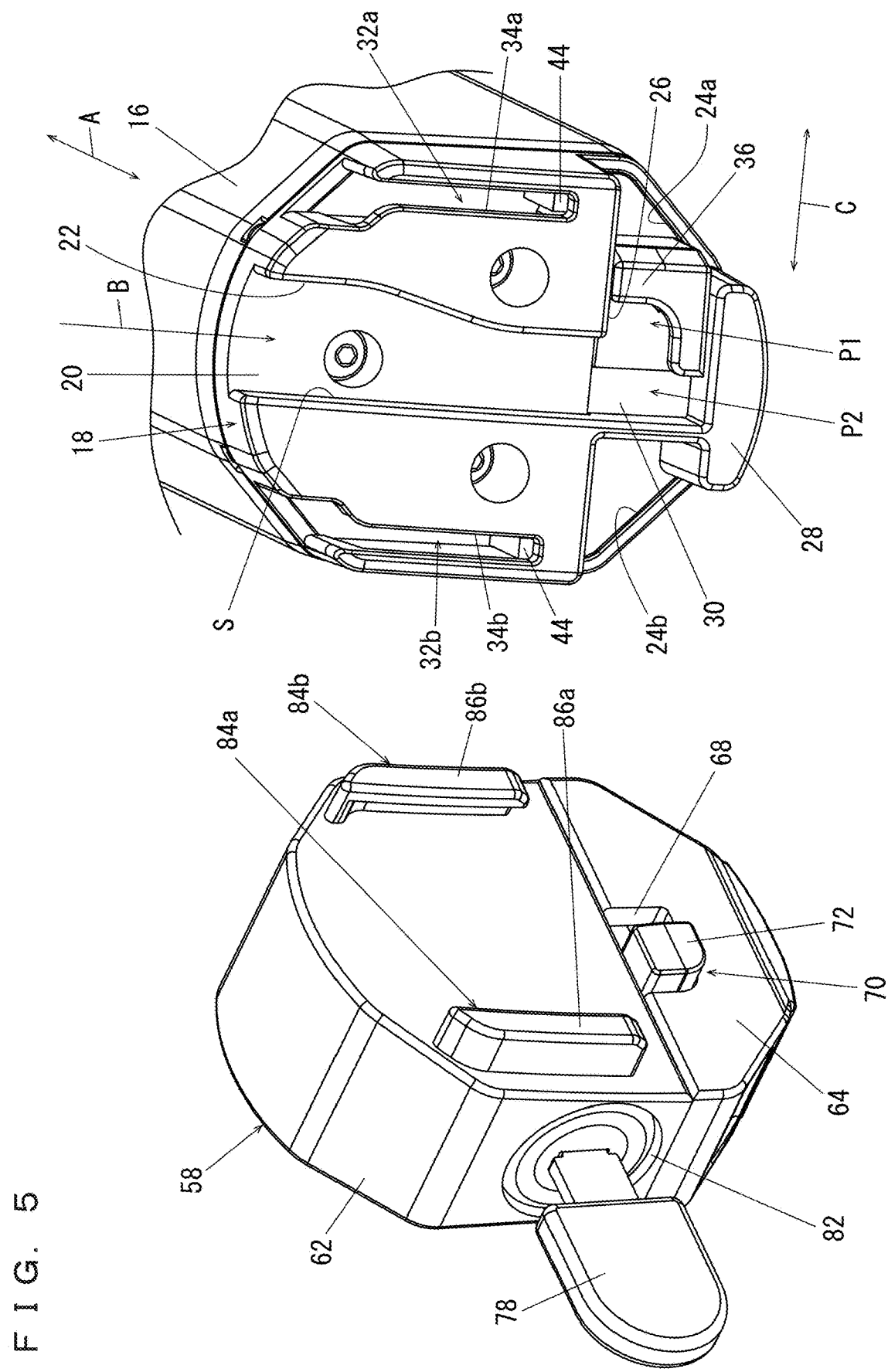
FIG. 5 is a perspective view which shows connecting surfaces between a first end portion of the battery and a first support portion of the battery mounting portion.

Referring further to FIG. 3 through FIG. 5, the mounting portion 18 includes a groove 20. The groove 20 extends at least in a removal direction indicated by Arrow B as viewed from a longitudinal direction of the battery 12 indicated by Arrow A, for an engaging portion 70 (which will be described below) to pass through. In the present preferred embodiment, the removal direction indicated by Arrow B is a direction for removing the battery 12 from the battery mounting portion 14, which is a direction to pivot the battery 12 around a second end portion of the battery 12 (see FIG. 9). As described above, the groove 20 is provided in a first end portion of the battery 12. The groove 20 is wider on its upstream side than its downstream side in the removal direction indicated by Arrow B. The groove 20 includes a guide portion 22. The guide portion 22 extends at least in the removal direction indicated by Arrow B as viewed from the longitudinal direction of the battery 12 indicated by Arrow A in order to guide the engaging portion 70. As described above, the guide portion 22 is provided in the first end portion of the battery 12.

The mounting portion 18 is provided with a through-hole 24*a* which communicates with a downstream end portion of the groove 20, and next to the through-hole 24*a*, a through-hole 24*b* is provided. The above-described arrangement provides a stepped portion 26 as the first movement restriction portion, and a generally T-shaped receiver portion 28 at the first end portion of the battery 12. The receiver portion 28 has a lower surface, which is flush or substantially flush with a lower surface of the battery main body 16. Also, on a downstream side of the groove 20, a platy (plate shaped) member 30 is provided to divide a portion of the through-hole 24*a*.

Also, in the mounting portion 18, a pair of guide groove portions 32*a*, 32*b* are provided to fit to guide tab portions 84*a*, 84*b* (which will be described below) along the removal direction indicated by Arrow B as viewed from the longitudinal direction of the battery 12 indicated by Arrow A. As understood, the guide groove portions 32*a*, 32*b* are provided in the first end portion of the battery 12, sandwiching the groove 20. The guide groove portions 32*a*, 32*b* respectively include second engagement portions 34*a*, 34*b* which are engageable with first engagement portions 86*a*, 86*b* (which will be described below). The second engagement portions 34*a*, 34*b* are provided by barbs on the respective guide groove portions 32*a*, 32*b*.

In the through-hole 24*a* of the mounting portion 18, there is provided a rectangular or substantially rectangular restriction release 36. The restriction release 36 includes a slit 38 and a strip-shaped guide portion 40 (see FIG. 2 and FIG. 3). When the platy member 30 is inserted into the slit 38, and the guide portion 40 is fitted into a slit 46 of a back lid 48 (which will be described below), the restriction release 36 is positioned between the stepped portion 26 and the receiver portion 28, thus making it possible to reciprocate in a direction perpendicular or substantially perpendicular to the removal direction indicated by Arrow B. In the state where the battery 12 is mounted onto the battery mounting portion 14, the restriction release 36 is located on a more downstream side than an operation portion 78 of a second movement restriction portion 74 which will be described below, in the removal direction indicated by Arrow B. Between the receiver portion 28 and the restriction release 36, a spring 42 is provided as the second biasing portion. The spring 42 urges or biases the restriction release 36 in a direction from a disengaged position P2 toward an engaged position P1. As described above, the restriction release 36 is provided in the first end portion of the battery 12 in order to move the engaging portion 70 from the engaged position P1 to the disengaged position P2, and to move in a widthwise direction of the battery 12 which is the direction indicated by Arrow C. Also, the guide groove portions 32*a*, 32*b* are provided with dampers 44, respectively. The dampers 44 include elastic members made of rubber, for example. When the battery 12 is mounted, the dampers 44 press the guide tab portions 84*a*, 84*b* in a direction to be pushed out of the guide groove portions 32*a*, 32*b* (i.e., the tab portions are biased in a direction against the insertion direction of the battery 12), making the engaging portion 70 press the stepped portion 26. This makes it possible to reduce rattling of the battery 12.

The mounting portion 18 as described so far has its back surface fitted with the back lid 48 which has a slit 46, and is fixed with a plurality of bolts 50, for example. The mounting portion 18 in this state is attached to the first end portion of the battery main body 16 with a plurality of bolts 52, for example, sandwiching the back lid 48 in between.

Figure 6:
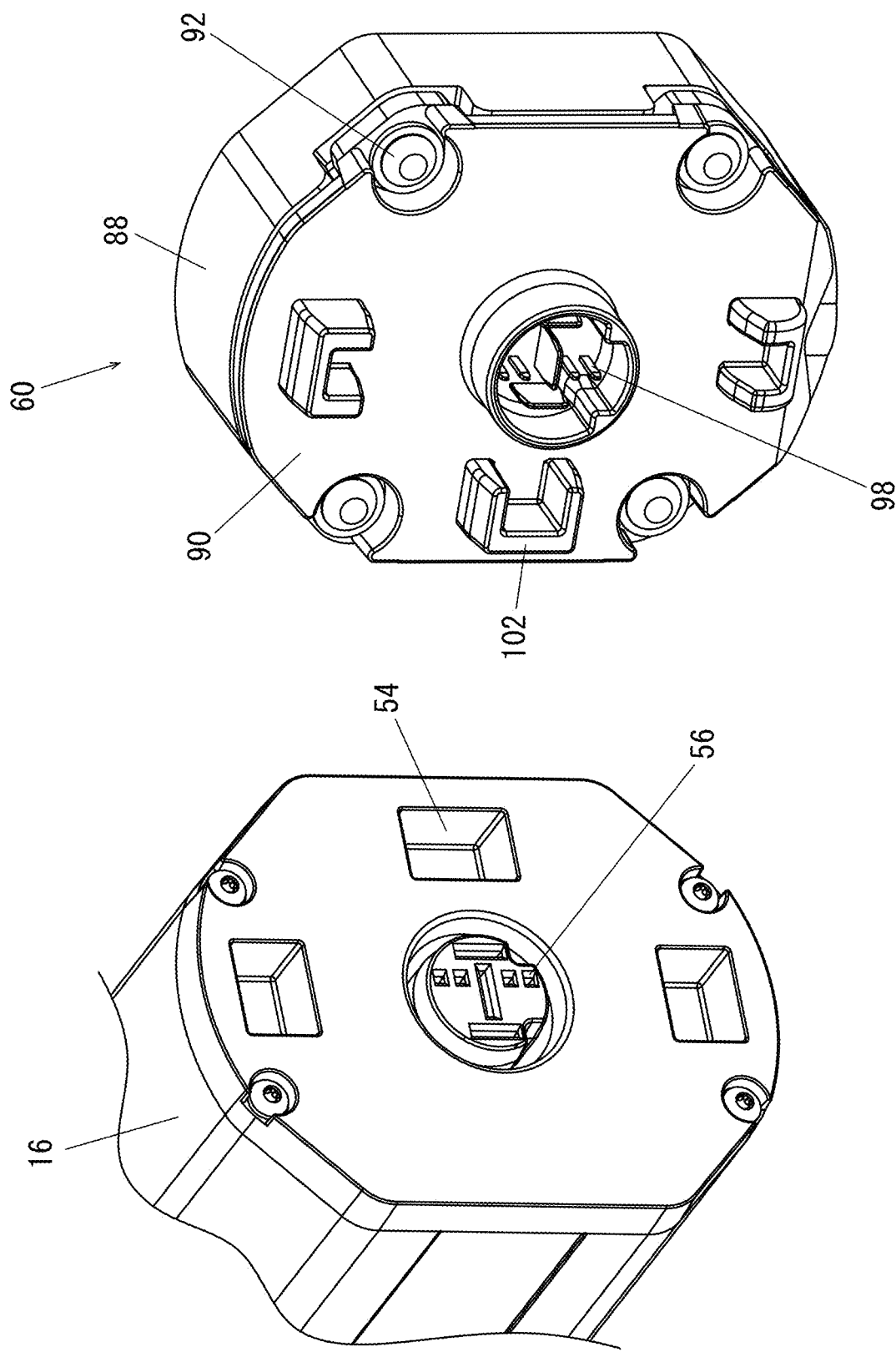
FIG. 6 is a perspective view which shows connecting surfaces between a second end portion of the battery and a second support portion of the battery mounting portion.

On the other hand, referring to FIG. 6, the battery main body 16 includes a second end portion where there is provided a plurality of positioning recesses 54, and a terminal 56 protrudes therefrom. The recesses 54 also function as anti-rotation members of the battery 12.

Referring to FIG. 2, the battery mounting portion 14 includes a first support portion 58 and a second support portion 60 which respectively support the first end portion and the second end portion of the battery 12, to allow attachment/detachment of the battery 12.

Referring to FIG. 2 and FIG. 5, the first support portion 58 includes an upper support portion 62 and a lower support portion 64. The upper support portion 62 and the lower support portion 64 are integrated with each other with a plurality of bolts 66, for example.

The lower support portion 64 includes a recess 68. The recess 68 houses the engaging portion 70. As described above, the engaging portion 70 is provided in the first support portion 58. The engaging portion 70 includes a protruding portion 72. In the state where the engaging portion 70 is housed in the recess 68, the protruding portion 72 protrudes from an end surface of the lower support portion 64 which is a surface facing the battery 12, making the engaging portion 70 movable between the engaged position P1 where it is engaged by the stepped portion 26 and the disengaged position P2 where it is not engaged by the stepped portion 26. In the present preferred embodiment, the engaged position P1 and the disengaged position P2 of the engaging portion 70 are provided along the widthwise direction of the battery 12 indicated by Arrow C. It should be noted here that the engaged position P1 is a position where the engaging portion 70 is engaged by the stepped portion 26, making the battery 12 undetachable from the battery mounting portion 14. On the other hand, the disengaged position P2 is a position where the engaging portion 70 is not engaged by the stepped portion 26, making the battery 12 detachable from the battery mounting portion 14. The same applies to other preferred embodiments which will be described below.

Also, the first support portion 58 is provided with the second movement restriction portion 74 in order to position the engaging portion 70 at the engaged position P1 and restrict the engaging portion 70 from moving toward the disengaged position P2. The second movement restriction portion 74 includes a spring 76 as the first biasing portion, an operation portion 78, and a stopper 80.

The spring 76 is provided between the recess 68 and the engaging portion 70. The spring 76 biases the engaging portion 70 in the direction from the disengaged position P2 toward the engaged position P1. Also, the upper support portion 62 has its side surface provided with a through-hole 82, into which the operation portion 78 is inserted. The first support portion 58 houses the stopper 80, which moves with the operation portion 78 and is engageable with the engaging portion 70. As shown in FIGS. 7A and 7B, as the operation portion 78 is rotated, the stopper 80 moves up and down, i.e., it is possible to move the stopper 80 into and out of a position where it is engaged with the engaging portion 70.

Also, returning to FIG. 2 and FIG. 5, the first support portion 58 is provided with a pair of guide tab portions 84a, 84b along the removal direction indicated by Arrow B as viewed from the longitudinal direction of the battery 12 indicated by Arrow A. The guide tab portions 84a, 84b are provided on a more upstream side than the engaging portion 70 in the removal direction, and include first engagement portions 86a, 86b, respectively. The first engagement portions 86a, 86b are provided by barbs on the respective guide tab portions 84a, 84b.

Referring to FIG. 2, FIG. 6 and FIGS. 10A and 10B, the second support portion 60 includes a storage portion 88 and a lid portion 90. The storage portion 88 and the lid portion 90 are integrated with each other with a plurality of bolts 92, for example.

The storage portion 88 includes a through-hole 94. A cable 96 is inserted through the through-hole 94 so that a terminal 98 of the cable 96 is exposed from the lid portion 90. A plurality of elastic members 100 made of rubber, for example, are inserted between an inner surface of the storage portion 88 and a back surface of the lid portion 90. This makes the lid portion 90 slightly displaceable axially (toward the storage portion 88) in the state where it is attached to the storage portion 88. On a surface of the lid portion 90, there is provided a plurality of protrusions 102 fittable into corresponding ones of the recesses 54 to position the battery 12.

Referring to FIG. 8 through FIGS. 10A and 10B, the first support portion 58 and the second support portion 60 as described above are provided near or adjacent the opening 2j of the hollow portion 2i in the down tube 2b. The first support portion 58 is fixed near one end of the opening 2j with a plurality of bolts 104, for example, and the second support portion 60 is fixed near the other end of the opening 2j with a plurality of bolts 106, for example. As described above, the battery mounting portion 14 fits inside the down tube 2b.

With respect to the battery mounting portion 14 as described above, the battery 12 is attached/detached in a direction in which the battery 12 is pivoted around the second end portion of the battery 12 which is supported by the second support portion 60. In this way, it is possible to put the battery 12 into and out of the hollow portion 2i of the down tube 2b through the opening 2j. The battery 12 as mounted on the battery mounting portion 14 fits inside the down tube 2b. The battery 12 which is in the state of being mounted on the battery mounting portion 14 is electrically connected with the motor 7a so that the battery 12 is able to supply electricity to the motor 7a.

Figure 11A:
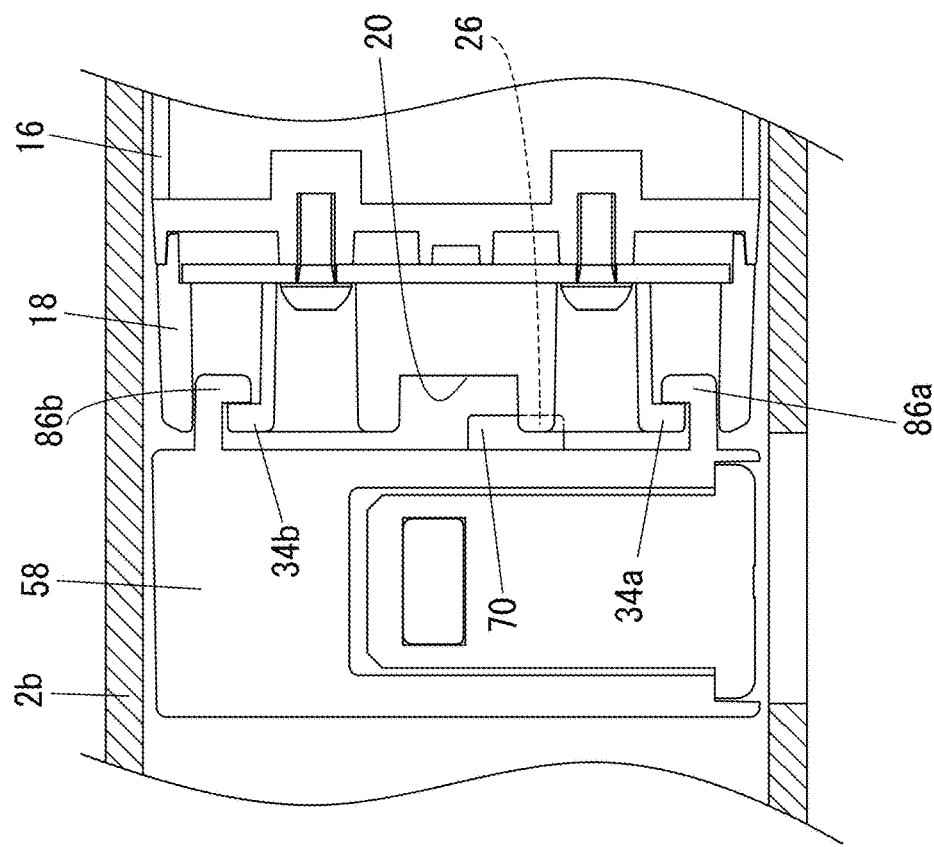
Figure 11B:
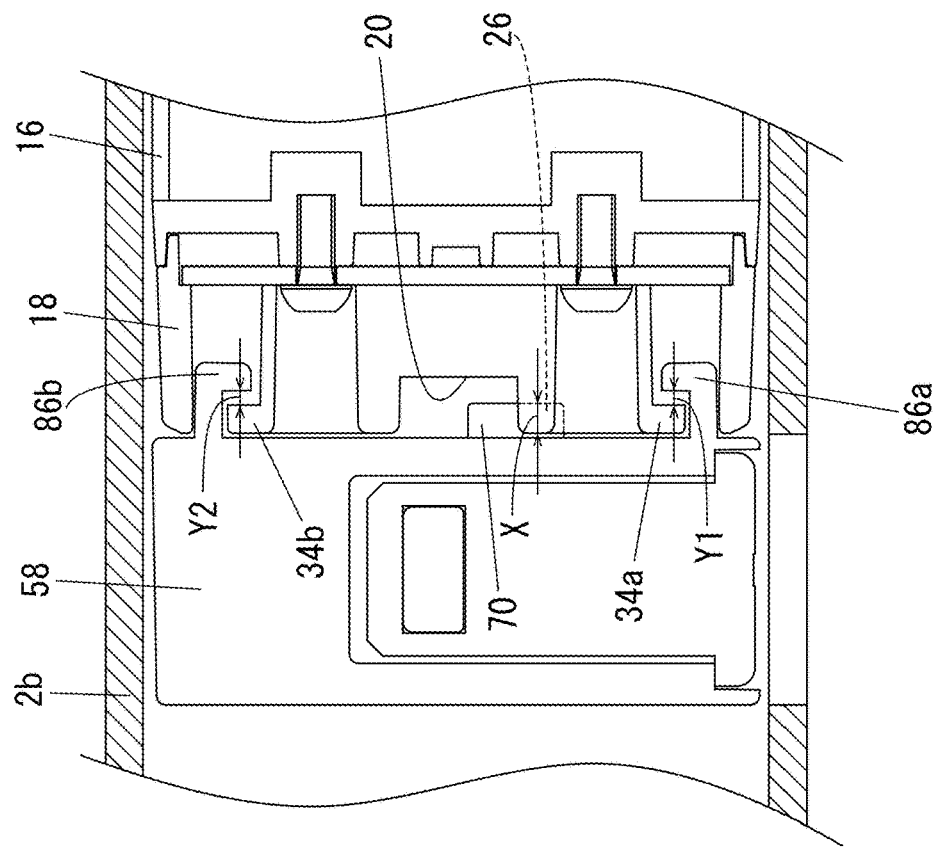

Referring to FIG. 11A, when the battery 12 is mounted on the battery mounting portion 14 and the engaging portion 70 is in the engaged position P1, the engaging portion 70 and the stepped portion 26 have an engagement margin X which is greater than a clearance Y1 between the first engagement portion 86a and the second engagement portion 34a, and a clearance Y2 between the first engagement portion 86b and the second engagement portion 34b. Thus, as shown in FIG. 11B, the engaging portion 70 is engaged with the stepped portion 26 even if the first engagement portions 86a, 86b are engaged with the second engagement portions 34a, 34b, respectively.

Next, reference will be made to FIG. 12 through FIGS. 14A to 14C to describe how the stopper 80 and the engaging portion 70 move when the operation portion 78 and the restriction release 36 are operated.

Figure 13A:
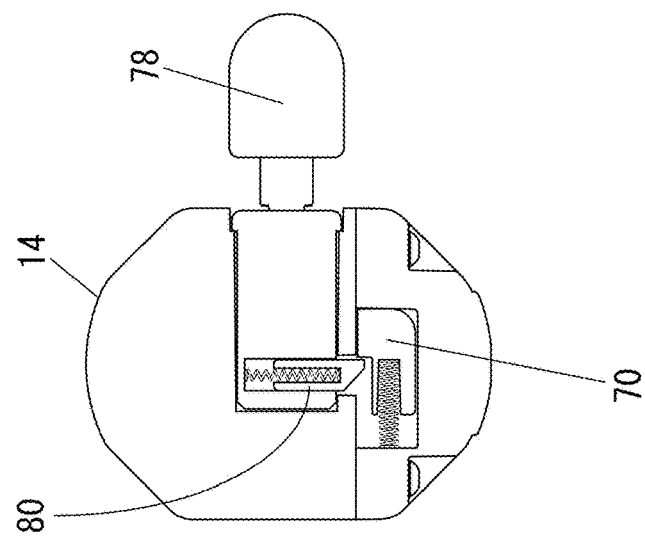
FIGS. 13A to 13C are illustrative side views which show movement of the stopper and the engaging portion when the operation portion and the restriction release are operated.

In a locked state shown in FIG. 12A, FIG. 13A, and FIG. 14A, the engaging portion 70 is engaged by the stopper 80 and is unable to move from the engaged position P1.

Figure 13B:
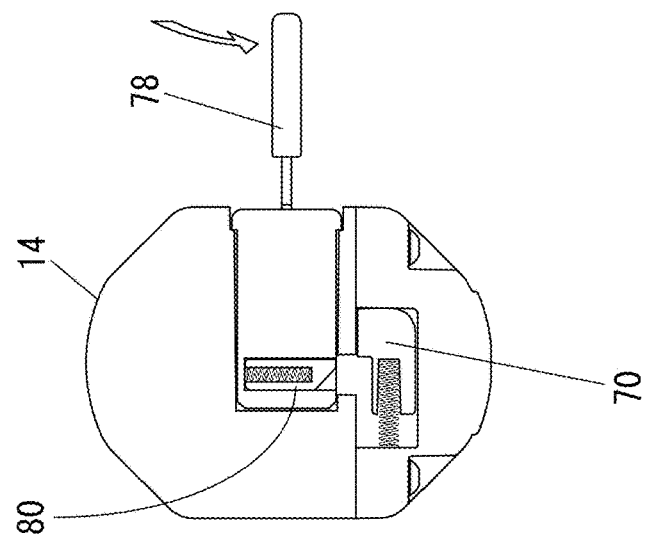
Figure 13C:
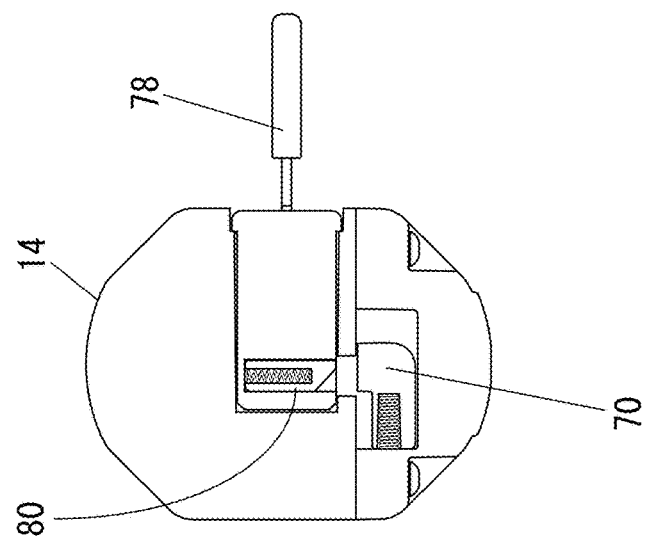

Next, reference will be made to FIG. 12B, FIG. 13B, and FIG. 14B. As the operation portion 78 is rotated, the stopper 80 rises. The engagement of the stopper 80 with the engaging portion 70 is removed, changing the state to the unlocked state and making the engaging portion 70 movable.

Then, as shown in FIGS. 12C and 12D, FIG. 13C and FIG. 14C, as the restriction release 36 is pushed in, the engaging portion 70 moves from the engaged position P1 to the disengaged position P2. In this step, the restriction release 36 is pushed more inward than a side surface of the receiver portion 28 which faces the operation portion 78, in order to allow the user to hook his/her fingers on the receiver portion 28 while pushing in the restriction release 36. Thus, the engaging portion 70 is disengaged from the stepped portion 26, and it is possible now for the engaging portion 70 to pass through the groove 20 which is in the mounting portion 18 of the battery 12.

Referring to FIGS. 15A and 15B, description will be made of steps to remove the battery 12 from the battery mounting portion 14.

Referring first to FIGS. 15A to 15F, after the operation portion 78 is rotated to change to the unlocked state as described above, the receiver portion 28 and the restriction release 36 are pinched from the widthwise direction indicated by Arrow C, to push in the restriction release 36. This causes the engaging portion 70 of the first support portion 58 to move from the engaged position P1 to the disengaged position P2. Then, the battery 12 is pulled downward. In other words, with respect to the battery mounting portion 14, the battery 12 is pivoted around the second end portion of the battery 12 in the removing direction indicated by Arrow B. Then, as shown in FIG. 15C and FIG. 15D, the engaging portion 70 moves in the groove 20 along the guide portion 22 of the mounting portion 18 of the battery 12, and the guide tab portions 84a, 84b of the first support portion 58 are pulled out of the guide groove portions 32a, 32b of the battery 12. Further, as shown in FIGS. 15A and 15F, as the engaging portion 70 moves away from the groove 20 of the mounting portion 18, the guide tab portions 84a, 84b of the first support portion 58 move away from the guide groove portions 32a, 32b of the battery 12, so the battery 12 is removed from the battery mounting portion 14, i.e., from the electric bicycle 1. Thereafter, the operation portion 78 is rotated to change to the locked state.

Referring to FIGS. 16A to 16E, description will be made of steps to attach the battery 12 to the battery mounting portion 14.

Referring first to FIGS. 16A and 16B, after the operation portion 78 is rotated to change to the unlocked state, the battery 12 is pushed in and upward. In other words, with respect to the battery mounting portion 14, the battery 12 is pivoted around the second end portion of the battery 12 in the reverse direction from the removing direction indicated by Arrow B. Then, the engaging portion 70 enters into the groove 20 before the guide tab portions 84a, 84b of the first support portion 58 enter into the guide groove portions 32a, 32b of the battery 12. Further, as shown in FIGS. 16C and 16D, as the engaging portion 70 moves in the groove 20 along the guide portion 22, the guide tab portions 84a, 84b of the first support portion 58 are inserted into the guide groove portions 32a, 32b of the battery 12. Then, as shown in FIG. 16E, the engaging portion 70 moves beyond the groove 20 of the mounting portion 18, and reaches the disengaged position P2, whereupon the engaging portion 70 is moved by the spring 76 in the widthwise direction of the battery 12 indicated by Arrow C, to reach the engaged position P1. In this process, the guide tab portions 84a, 84b of the first support portion 58 are inserted deeply into the guide groove portions 32a, 32b of the battery 12, but then slightly pushed back by the dampers 44, causing the engaging portion 70 to be pressed by the stepped portion 26. Thereafter, the operation portion 78 is rotated to change to the locked state.

According to the electric bicycle 1 described above, in the state where the battery 12 is mounted on the battery mounting portion 14, the second movement restriction portion 74 provided in the first support portion 58 acts on the engaging portion 70 such that the engaging portion 70 provided in the first support portion 58 is in the engaged position P1 where the engaging portion 70 is restricted from moving to the disengaged position P2. Sine the engaging portion 70, which is in the engaged position P1, is engaged by the stepped portion 26, which is provided at the first end portion of the battery 12 to function as the first movement restriction portion, it is now impossible to remove the battery 12 from the battery mounting portion 14, i.e., the mounting of the battery 12 onto the battery mounting portion 14 is now locked. When the battery 12 is to be removed from the state of mounting as described above, the restriction by the second movement restriction portion 74 is removed, the engaging portion 70 is moved from the engaged position P1 to the disengaged position P2 such that the engagement between the engaging portion 70 and the stepped portion 26 is disengaged, and then the battery 12 is pulled in the detaching direction to remove from the battery mounting portion 14. As described above, with a simple action of moving the engaging portion 70 from the engaged position P1 to the disengaged position P2 and then pulling out the battery 12, it is possible to remove the battery 12 from the battery mounting portion 14 in a simple manner.

By making the engaging portion 70 engage with the stepped portion 26, it becomes possible to easily prohibit the movement of the engaging portion 70 in the detaching direction.

By biasing the engaging portion 70 from the disengaged position P2 toward the engaged position P1 with the spring 76 which functions as the first biasing portion, it becomes possible to easily position the engaging portion 70 at the engaged position P1.

By making the stopper 80 move with the operation of the operation portion 78, it becomes possible to easily move the stopper 80 into and out of the position where it is engaged with the engaging portion 70. Therefore, it is possible by operating the operation portion 78 to position the engaging portion 70 at the engaged position P1 and easily restrict the engaging portion 70 from moving to the disengaged position P2.

When the engaging portion 70 is at the engaged position P1, operating the operation portion 78 only removes engagement of the stopper 80 with the engaging portion 70, in other words, the engaging portion 70 does not move from the position. Therefore, the engaging portion 70 remains engaged with the stepped portion 26 such that it is possible to restrict the battery 12 from moving in the gravitational direction, and thus restrict the battery 12 from being unwillingly removed from the battery mounting portion 14.

With the restriction release 36, it is possible to easily move the engaging portion 70 from the engaged position P1 to the disengaged position P2. In particular, since it is possible to move the engaging portion 70 indirectly, the arrangement offers an advantage in cases where it is not possible to operate the engaging portion 70 directly.

If the restriction release 36 were to be moved in the longitudinal direction of the battery 12, the user could only move his/her finger in one direction, i.e., he/she cannot pinch the restriction release 36 with two fingers. However, by making the restriction release 36 move in the widthwise direction of the battery 12, it becomes possible to pinch the restriction release 36 with the user's fingers, which makes it even easier to remove the battery 12.

The restriction release 36 is on a more downstream side than the operation portion 78 of the second movement restriction portion 74 in the removal direction. Therefore, it is possible to support the battery 12 by the hand at the same time while operating the restriction release 36, i.e., there is no need to use the other hand to support the battery 12, and the arrangement makes it easy to remove the battery 12. This arrangement is especially effective when the battery 12 is removed downward from the battery mounting portion 14.

By biasing the restriction release 36 in the direction from the disengaged position P2 toward the engaged position P1 with the spring 42 which functions as the second biasing portion, it becomes possible to make the restriction release 36 not overlap the stepped portion 26, and to secure a space for the engaging portion 70 to move within. As a result, when mounting the battery 12, the engaging portion 70 does not hit the restriction release 36 in the middle of the process when the engaging portion 70 moves from the disengaged position P2 to the engaged position P1. This arrangement makes it possible for the engaging portion 70 to move smoothly. Also, it is possible to provide the restriction release 36 at a location where it is easily operated. Further, when the battery 12 is removed and carried by itself, the restriction release 36 is biased in one direction making it possible to reduce uncomfortable rattling noises.

It is possible to remove the battery 12 smoothly from the battery mounting portion 14 by making the guide portion 22 guide the engaging portion 70.

By letting the engaging portion 70 slide inside the groove 20, it becomes possible to remove the battery 12 reliably from the battery mounting portion 14.

The groove 12 is wider on its upstream side than its downstream side in the removal direction indicated by Arrow B. This arrangement makes it easier to insert the engaging portion 70 into the groove 12, and to amount the battery 12 easily onto the battery mounting portion 14.

The guide groove portions 32a, 32b are fitted with the guide tab portions 84a, 84b. This arrangement makes it possible to restrict the battery 12 from tilting or rotating with respect to the battery mounting portion 14.

The guide groove portions 32a, 32b and the guide portion 22 are provided at the first end portion of the battery 12 while the guide tab portions 84a, 84b and the engaging portion 70 are provided at the first support portion 58. This arrangement allows the user to focus his/her attention onto the first end portion side of the battery 12. This makes it possible to mount the battery 12 easily onto the battery mounting portion 14.

The guide tab portions 84a, 84b are provided on a more upstream side than the engaging portion 70 in the removal direction. Therefore, it is possible to move the guide tab portions 84a, 84b by fitting them into the guide groove portions 32a, 32b after moving the engaging portion 70 along the guide portion 22. Therefore, it is possible to smoothly mount the battery 12 onto the battery mounting portion 14.

The guide tab portions 84a, 84b have their first engagement portions 86a, 86b engaged respectively with the second engagement portions 34a, 34b of the guide groove portions 32a, 32b. This helps discourage theft of the battery 12.

The engagement margin X between the engaging portion 70 and the stepped portion 26 is greater than the clearances Y1, Y2 between the first engagement portions 86a, 86b and the second engagement portions 34a, 34b. Therefore, even in a situation where the first engagement portions 86a, 86b are respectively engaged with the second engagement portions 34a, 34b, the engaging portion 70 comes into engagement with the stepped portion 26. Therefore, it is possible, regardless of whether or not the first engagement portions 86a, 86b and the second engagement portions 34a, 34b are engaged with each other, to bring the engaging portion 70 at the engaged position P1 into engagement with the stepped portion 26, i.e., it is possible to prevent a situation that the engagement between the engaging portion 70 and the stepped portion 26 is lost unwillingly.

When the battery 12 is mounted onto the battery mounting portion 14, it is possible with the dampers 44 to keep the engaging portion 70 and the stepped portion 26 pressed toward each other, making it possible to reduce rattling of the battery 12 in the detaching direction.

The receiver portion 28 has a shape substantially the same as the shape of the letter T. This arrangement makes it easy to hook the user's fingers and to pull the battery 12 out of the mounting position.

The battery device 10 according to preferred embodiments of the present invention is suitably applied to an electric bicycle 1.

In a preferred embodiment of the present invention, the engaging portion 70 and the restriction release 36 are separate elements. However, the present invention is not limited to this. There may be used an engaging portion which also functions as a restriction release.

Referring to FIGS. 17A to 17d and FIGS. 19A to 19C, description will be made of a preferred embodiment which includes an engaging portion 70a which also functions as a restriction release, and a procedure to remove a battery 12a from the battery mounting portion 14a.

Figure 18A:
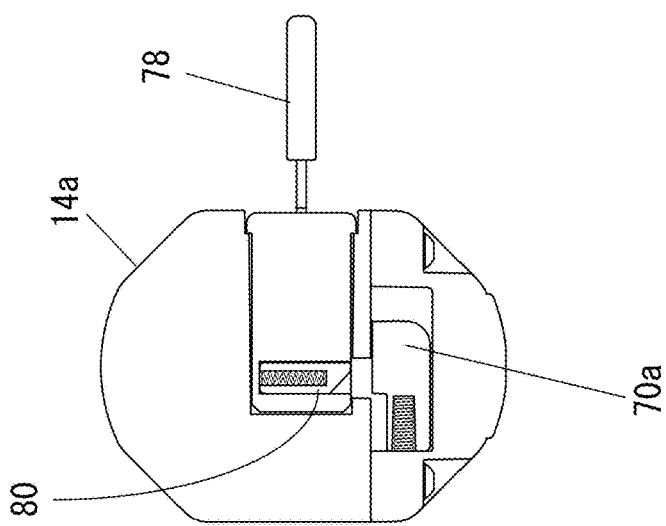
FIGS. 18A to 18C are illustrative side views which show movement of the stopper and the engaging portion when the operation portion and the engaging portion are operated in the preferred embodiment of the present invention shown in FIGS. 17A to 17D.
Figure 19A:
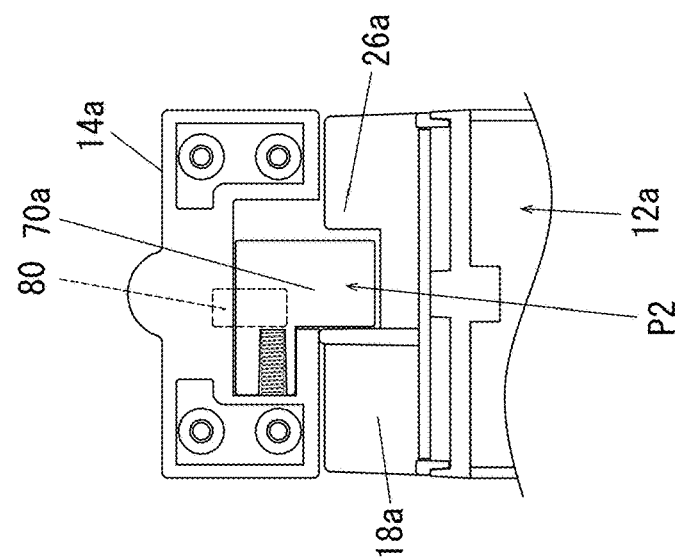
FIGS. 19A to 19C are illustrative bottom views which show movement of the stopper and the engaging portion when the operation portion and the engaging portion are operated in the preferred embodiment of the present invention shown in FIGS. 17A to 17D.

In a locked state shown in FIG. 17A, FIG. 18A and FIG. 19A, the engaging portion 70a is engaged by the stopper 80 and is unable to move from the engaged position P1.

Figure 18B:
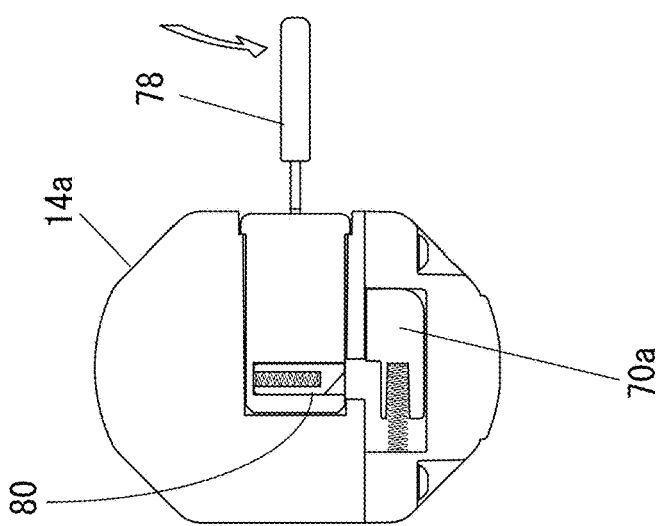
Figure 18C:
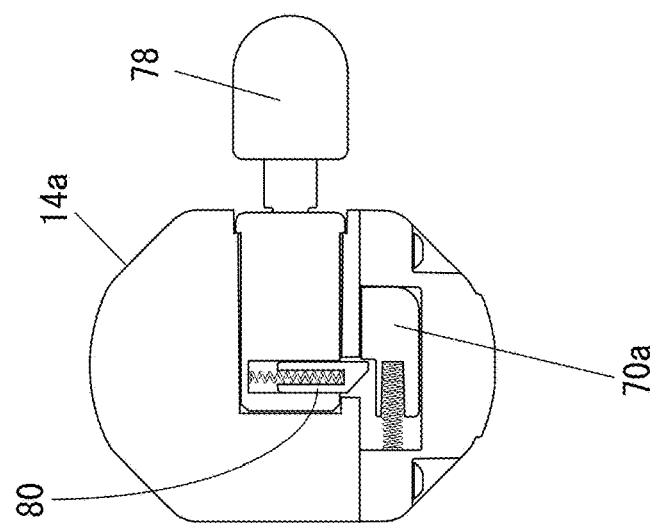
Figure 19B:
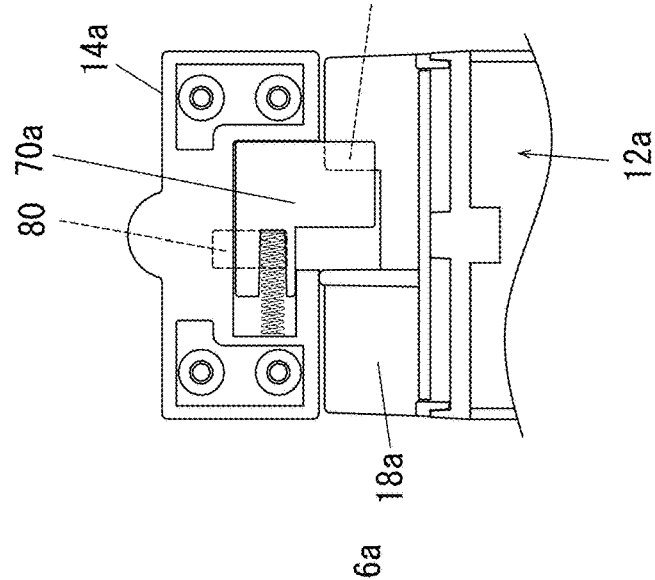
Figure 19C:
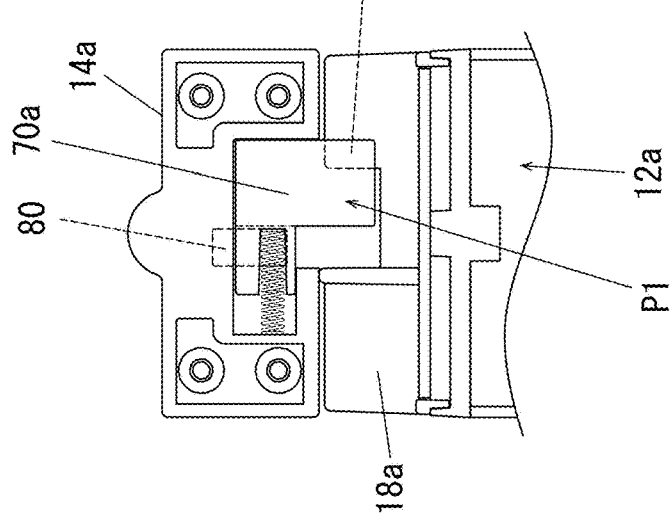

Next, referring to FIG. 17B, FIG. 18B, and FIG. 19B, as the operation portion 78 is rotated to change to an unlocked state, the stopper 80 rises to disengage from the engaging portion 70a, making the engaging portion 70a movable.

Then, as shown in FIG. 17C and 17D, FIG. 18C, and FIG. 19C, as the engaging portion 70a is pushed in, the engaging portion 70a moves from the engaged position P1 to the disengaged position P2. Thus, the engaging portion 70a is disengaged from a stepped portion 26a, and it is possible now for the engaging portion 70a to pass through a groove 20a in a mounting portion 18a of the battery 12a. Thereafter, the battery 12a is pivoted with respect to the battery mounting portion 14a, around the second end portion of the battery 12a so that the engaging portion 70a is able to pass through the groove 20a such that it becomes possible to remove the battery 12a from the battery mounting portion 14a.

In a preferred embodiment of the present invention described above, the engaged position P1 and the disengaged position P2 of the engaging portion 70 are provided in the widthwise direction of the battery 12. However, the present invention is not limited to this. The engaged position and the disengaged position of the engaging portion may be provided in the longitudinal direction of the battery.

Referring to FIGS. 20A to 20C and FIGS. 21A to 21C, description will be made of a preferred embodiment in which the engaged position P1 and the disengaged position P2 of an engaging portion 70b are provided in the longitudinal direction of a battery 12b, and a procedure to remove the battery 12b from the battery mounting portion 14b. In this case, the engaging portion 70b moves in the longitudinal direction of the battery 12b indicated by Arrow A.

Figure 21A:
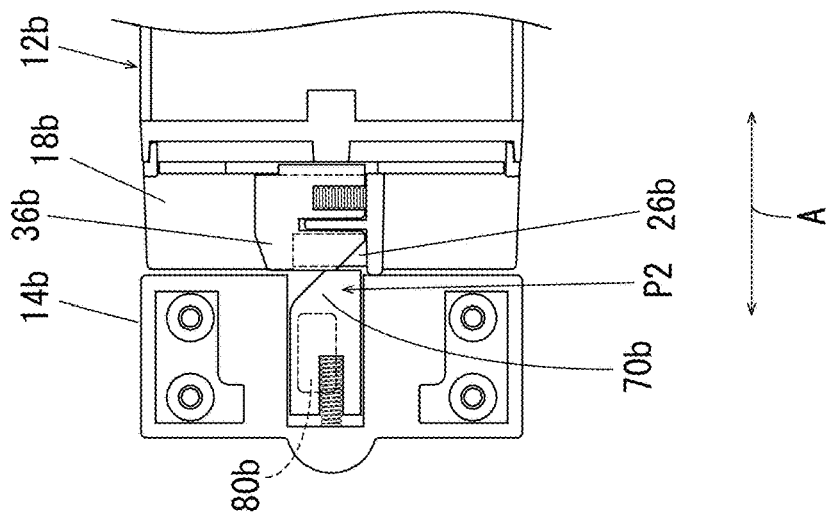
FIGS. 21A to 21C are illustrative bottom views which show movement of the stopper and the engaging portion when the operation portion and the restriction release are operated in the preferred embodiment of the present invention shown in FIGS. 20A to 20C.

In a locked state shown in FIG. 20A and FIG. 21A, the engaging portion 70b is engaged by a stopper 80b and is unable to move from the engaged position P1.

Figure 21B:
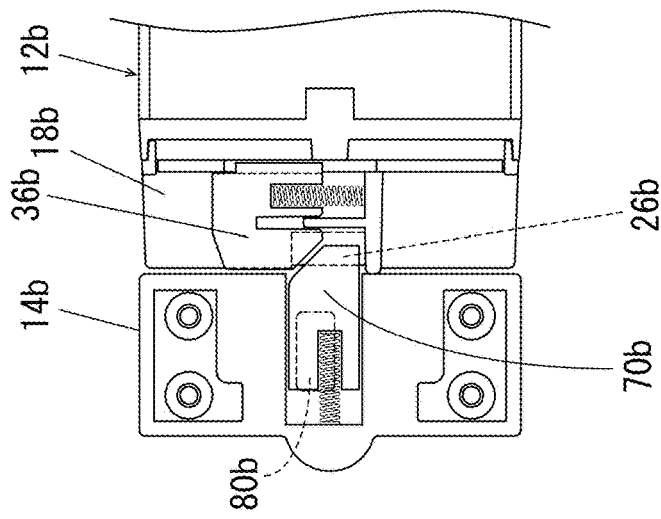

Next, referring to FIG. 20B and FIG. 21B, as the operation portion 78 is rotated to change to an unlocked state, the stopper 80b rises to disengage from the engaging portion 70b, making the engaging portion 70b movable in the longitudinal direction of the battery 12b indicated by Arrow A.

Figure 21C:
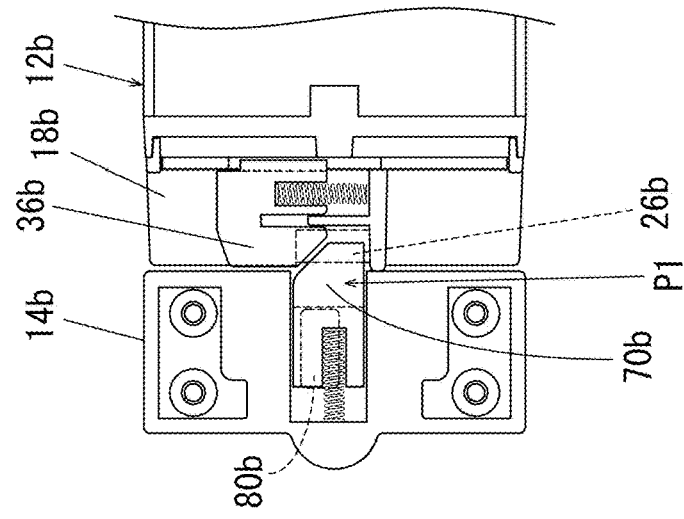

Then, as shown in FIG. 20C and FIG. 21C, as the restriction release 36b is pushed in, the engaging portion 70b moves from the engaged position P1 to the disengaged position P2. Thus, the engaging portion 70b is disengaged from a stepped portion 26b, and it is possible now for the engaging portion 70b to pass through the groove 20b in the mounting portion 18b of the battery 12b. Thereafter, the battery 12b is pivoted with respect to the battery mounting portion 14b around the second end portion of the battery 12b so that the engaging portion 70b is able to pass through the groove 20b such that it becomes possible to remove the battery 12b from the battery mounting portion 14b.

Figure 22:
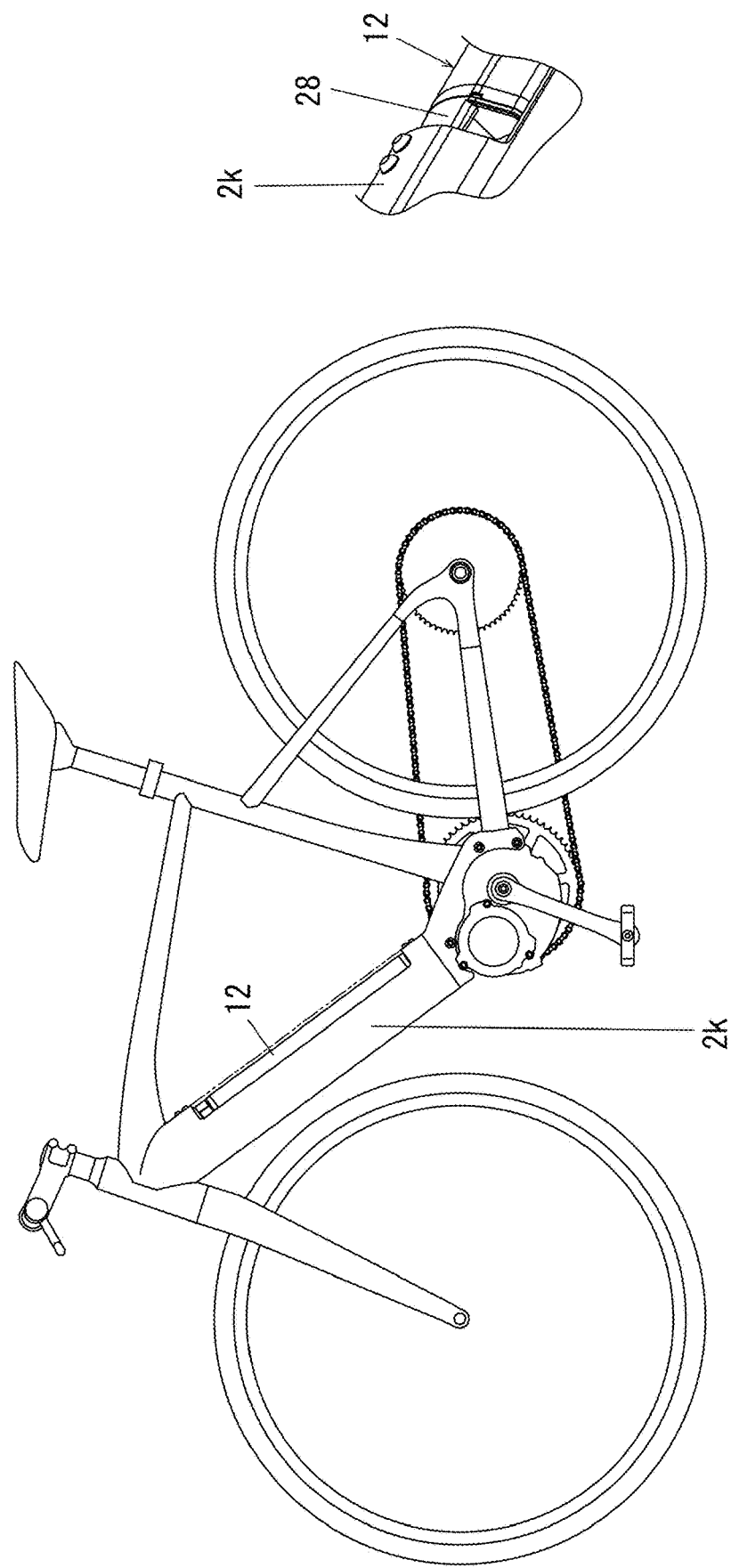
FIG. 22 is a side view which shows an electric bicycle according to another preferred embodiment of the present invention.

In a preferred embodiment of the present invention described above, the battery 12 is removed in a downward direction, from the down tube 2b. However, the present invention is not limited to this. Like an electric bicycle 1a shown in FIG. 22, the battery 12 may be removed in an upward direction from a down tube 2k. In other words, the battery 12 may be attached/detached to and from a top side of the battery device 14 which is provided in the down tube 2k. In this case, it is possible to pull the battery 12 upward easily by hooking a finger on the generally T-shaped receiver portion 28 of the battery 12.

In a preferred embodiment of the present invention described above, the guide tab portions 84a, 84b are provided in the battery mounting portion 14, and the guide groove portions 32a, 32b are provided in the battery 12. However, the present invention is not limited to this. There may be an arrangement in which guide tab portions are provided in the battery while the guide groove portions are provided in the battery mounting portion.

Also, the guide tab portions and the guide groove portions may be provided only on the second support portion side (the second end portion side of the battery), or between the first support portion and the second support portion, i.e., in an outer side surface of the battery and the down tube.

The quantity of each of the guide tab portions and the guide groove portions is not limited to two, but may be any number. The quantity of the guide tab portion and the guide groove portion may be one each, for example, or three each or more.

In a preferred embodiment of the present invention described above, the detaching direction of the battery 12 from the battery mounting portion 14 is a direction in which the battery 12 is pivoted around the second end portion of the battery 12. However, the present invention is not limited to this. The removal direction of the battery from the battery mounting portion may be a direction perpendicular or substantially perpendicular to the longitudinal direction of the battery.

In a preferred embodiment of the present invention described above, the second movement restriction portion 74 includes the spring 76 as the first biasing portion, the operation portion 78, and the stopper 80. However, the present invention is not limited to this. The second movement restriction portion may only include the first biasing portion. In this case, by pushing the engaging portion, it is possible to move the engaging portion from the engaged position P1 to the disengaged position P2 against the restriction by the first biasing portion. Also, the second movement restriction portion may only include the operation portion and the stopper.

The first movement restriction portion is not limited to the stepped portion, but may include any structure able to make engagement with the engaging portion.

The first biasing portion and the second biasing portion are not limited to a spring, and may be provided by elastic members made of rubber, for example.

Referring to FIG. 5, the groove 20 need not necessarily have a straight side portion S.

In a preferred embodiment of the present invention described above, the battery device 10 is disposed inside the down tube 2b. However, the present invention is not limited to this. The battery device 10 may be attached on a surface of the down tube.

In a preferred embodiment of the present invention described above, the battery device 10 is attached to the down tube 2b. However, the present invention is not limited to this. The battery device 10 may be attached on the seat tube 2c, for example, or the battery device 10 may be attached to any other tube.

In a preferred embodiment of the present invention described above, description was made for a case where the electric bicycle is provided by an electrically assisted bicycle. However, the present invention is not limited to this. The electric bicycle may be any bicycle as long as it is able to travel using electricity from a battery.

The electric bicycle may include three or more wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A battery device comprising:
a battery;
a battery mount including a first support and a second support respectively supporting a first end and a second end of the battery to allow attachment/detachment of the battery;
a first movement restrictor provided at the first end of the battery;
an engaging portion provided in the first support and movable between an engaged position to engage with the first movement restrictor and a disengaged position in which engaging portion is not engaged with the first movement restrictor; and
a second movement restrictor provided in the first support to position the engaging portion at the engaged position to restrict the engaging portion from moving toward the disengaged position; wherein
the battery is removable from the battery mount in a removal direction that is either a direction in which the battery is pivoted around the second end of the battery, or a direction perpendicular or substantially perpendicular to a longitudinal direction of the battery;
the engaged position and the disengaged position of the engaging portion extend along a widthwise direction or the longitudinal direction of the battery; and
the engaged position is a position where the engaging portion is in engagement with the first movement restrictor to make the battery non-removable from the battery mount, and the disengaged position is a position where the engaging portion is not in engagement with the first movement restrictor to make the battery removable from the battery mount.

2. The battery device according to claim 1, wherein the first movement restrictor includes a stepped portion provided at the first end of the battery.

3. The battery device according to claim 1, wherein the second movement restrictor includes a first biaser to bias the engaging portion from the disengaged position toward the engaged position.

4. The battery device according to claim 1, wherein the second movement restrictor includes a stopper and an operator to advance/retract the stopper to/from a position where the stopper is engaged by the engaging portion.

5. The battery device according to claim 1, further comprising a restriction release provided in the first end of the battery to move the engaging portion from the engaged position to the disengaged position.

6. The battery device according to claim 5, wherein the restriction release is movable in a widthwise direction of the battery.

7. The battery device according to claim 4, further comprising a restriction release provided in the first end of the battery to move the engaging portion from the engaged position to the disengaged position; wherein
the restriction release is located on a more downstream side than the operator of the second movement restrictor in the removal direction.

8. The battery device according to claim 5, further comprising a second biaser to bias the restriction release from the disengaged position toward the engaged position.

9. The battery device according to claim 1, further comprising a guide provided in the first end of the battery and extending at least in the removal direction as viewed from the longitudinal direction of the battery to guide the engaging portion.

10. The battery device according to claim 9, further comprising a groove including the guide, the groove being provided in the first end of the battery and extending at least in the removal direction as viewed from the longitudinal direction of the battery to allow the engaging portion to pass therethrough.

11. The battery device according to claim 10, wherein the groove is wider on an upstream side of the guide than a downstream side of the guide in the removal direction.

12. The battery device according to claim 1, further comprising:
- a guide tab provided in one of the battery and the battery mount; and
- a guide groove provided in the other of the battery and the battery mount to receive the guide tab therein.

13. The battery device according to claim 12, wherein
- the guide tab is provided in the first support and extends along the removal direction as viewed from the longitudinal direction of the battery; and
- the guide groove is provided in the first end of the battery and extends along the removal direction as viewed from the longitudinal direction of the battery.

14. The battery device according to claim 12, wherein the guide tab is provided on a more upstream side than the engaging portion in the removal direction.

15. The battery device according to claim 12, wherein
- the guide tab includes a first engagement portion; and
- the guide groove includes a second engagement portion engageable with the first engagement portion.

16. The battery device according to claim 15, wherein the engaging portion and the first movement restrictor have an engagement margin that is greater than a clearance between the first engagement portion and the second engagement portion when the battery is mounted on the battery mount and the engaging portion is in the engaged position.

17. The battery device according to claim 12, further comprising a damper provided in the guide groove.

18. The battery device according to claim 1, further comprising a T-shaped or substantially T-shaped receiver provided in the first end of the battery.

19. An electric bicycle comprising:
the battery device according to claim 1.

20. The battery device according to claim 5, wherein the restriction release is integral with the engaging portion.

* * * * *